United States Patent
Kerr

(10) Patent No.: US 10,503,912 B1
(45) Date of Patent: Dec. 10, 2019

(54) MULTI-CHANNEL COMMUNICATION OF DATA FILES

(71) Applicant: NEXRF CORP., Reno, NV (US)

(72) Inventor: Michael Anthony Kerr, Reno, NV (US)

(73) Assignee: NEXRF CORP., Reno, NV (US)

( * ) Notice: Subject to any disclaimer, the term of this patent is extended or adjusted under 35 U.S.C. 154(b) by 289 days.

(21) Appl. No.: 14/516,577

(22) Filed: Oct. 16, 2014

Related U.S. Application Data

(60) Provisional application No. 62/036,278, filed on Aug. 12, 2014.

(51) Int. Cl.
| | |
|---|---|
| H04L 29/06 | (2006.01) |
| G06F 21/60 | (2013.01) |
| H04W 12/04 | (2009.01) |

(52) U.S. Cl.
CPC ........ G06F 21/602 (2013.01); H04L 63/0428 (2013.01); H04W 12/04 (2013.01)

(58) Field of Classification Search
CPC ....... H04W 4/023; H04L 29/06; G06F 21/602
USPC .................................................. 713/153, 170
See application file for complete search history.

(56) References Cited

U.S. PATENT DOCUMENTS

| | | | |
|---|---|---|---|
| 4,339,798 A | 7/1982 | Hedges et al. |
| 4,856,787 A | 8/1989 | Itkis |
| 5,586,937 A | 12/1996 | Menashe |
| 5,594,491 A | 1/1997 | Hodge et al. |
| 5,630,757 A | 5/1997 | Gagin et al. |
| 5,643,086 A | 7/1997 | Alcorn et al. |
| 5,738,583 A | 4/1998 | Comas et al. |
| 5,761,416 A | 6/1998 | Mandal et al. |
| 5,761,647 A | 6/1998 | Boushy |
| 5,762,552 A | 6/1998 | Vuong et al. |
| 5,768,382 A | 6/1998 | Schneier et al. |
| 5,779,545 A | 7/1998 | Berg et al. |
| 5,795,228 A | 8/1998 | Trumbull |
| 5,800,268 A | 9/1998 | Molnick |

(Continued)

FOREIGN PATENT DOCUMENTS

| | | |
|---|---|---|
| JP | 2004289828 A | 10/2004 |
| JP | 2009025019 A | 2/2009 |
| WO | 2008065257 A1 | 6/2008 |

OTHER PUBLICATIONS

"Ekahau Positioning Engine 4.2." 2008. http://www.nowire.se/images/produktblad/ekahau/datasheet.sub.—epe.sub.—-42.sub.—e . . .

(Continued)

*Primary Examiner* — Farid Homayounmehr
*Assistant Examiner* — Suman Debnath
(74) *Attorney, Agent, or Firm* — Kerr IP Group, LLC

(57) ABSTRACT

A context aware relevance engine with a server driven narrative is presented as a system for serving relevant content that includes a wireless device, a server, a positioning module, a user profile module, a content module, a ranking content module, a content delivery module, a wireless display, a responsive input is described. The wireless device wirelessly communicates with a network and the wireless device is configured to run a web browser or download a software application module. The server is communicatively coupled to the wireless device via the network and the server authenticates the wireless device or the web browser.

16 Claims, 24 Drawing Sheets

(56) References Cited

U.S. PATENT DOCUMENTS

| | | |
|---|---|---|
| 5,851,149 A | 12/1998 | Xidos et al. |
| 5,871,398 A | 2/1999 | Schneier et al. |
| 5,902,983 A | 5/1999 | Crevelt et al. |
| 5,947,821 A | 9/1999 | Stone |
| 5,970,143 A | 10/1999 | Schneier |
| 5,971,849 A | 10/1999 | Falciglia |
| 6,001,016 A | 12/1999 | Walker et al. |
| 6,010,404 A | 1/2000 | Walker et al. |
| 6,106,396 A | 8/2000 | Alcorn et al. |
| 6,142,876 A | 11/2000 | Cumbers |
| 6,159,095 A | 12/2000 | Frohm et al. |
| 6,178,510 B1 | 1/2001 | O'Connor et al. |
| 6,203,428 B1 | 3/2001 | Giobbi et al. |
| 6,217,447 B1 | 4/2001 | Lofink |
| 6,220,961 B1 | 4/2001 | Keane |
| 6,259,405 B1 | 7/2001 | Stewart et al. |
| 6,322,446 B1 | 11/2001 | Yacenda |
| 6,327,535 B1 | 12/2001 | Evans et al. |
| 6,409,602 B1 | 6/2002 | Wiltshire et al. |
| 6,500,068 B2 | 12/2002 | Walker et al. |
| 6,508,709 B1 | 1/2003 | Karmarkar |
| 6,508,710 B1 | 1/2003 | Paravia et al. |
| 6,527,638 B1 | 3/2003 | Walker et al. |
| 6,554,705 B1 | 4/2003 | Cumbers |
| 6,575,834 B1 | 6/2003 | Lindo |
| 6,606,494 B1 | 8/2003 | Arpee et al. |
| 6,612,928 B1 | 9/2003 | Bradford et al. |
| 6,628,939 B2 | 9/2003 | Paulsen |
| 6,638,170 B1 | 10/2003 | Crumby |
| 6,640,218 B1 | 10/2003 | Golding et al. |
| 6,676,522 B2 | 1/2004 | Rowe et al. |
| 6,682,421 B1 | 1/2004 | Rowe et al. |
| 6,702,672 B1 | 3/2004 | Angell et al. |
| 6,709,333 B1 | 3/2004 | Bradford et al. |
| 6,709,631 B2 | 3/2004 | Mori et al. |
| 6,719,631 B1 | 4/2004 | Tulley et al. |
| 6,749,512 B2 | 6/2004 | MacGregor et al. |
| 6,751,732 B2 * | 6/2004 | Strobel .................. G06F 21/608 380/255 |
| 6,782,253 B1 | 8/2004 | Shteyn et al. |
| 6,834,195 B2 | 12/2004 | Brandenberg et al. |
| 6,875,110 B1 | 4/2005 | Crumby |
| 6,879,838 B2 | 4/2005 | Rankin et al. |
| 6,884,162 B2 | 4/2005 | Raverdy et al. |
| 6,942,574 B1 | 9/2005 | LeMay et al. |
| 7,035,651 B2 | 4/2006 | Schreiner et al. |
| 7,076,243 B2 | 7/2006 | Parupudi et al. |
| 7,107,245 B1 | 9/2006 | Kowalick |
| 7,136,915 B2 | 11/2006 | Rieger, III |
| 7,196,662 B2 | 3/2007 | Misikangas et al. |
| 7,209,752 B2 | 4/2007 | Myllymaki et al. |
| 7,213,048 B1 | 5/2007 | Parupudi et al. |
| 7,218,941 B1 | 5/2007 | Kubo et al. |
| 7,228,136 B2 | 6/2007 | Myllymaki et al. |
| 7,299,059 B2 | 11/2007 | Misikangas et al. |
| 7,338,372 B2 | 3/2008 | Morrow et al. |
| 7,341,522 B2 | 3/2008 | Yamagishi |
| 7,349,683 B2 | 3/2008 | Misikangas |
| 7,359,714 B2 | 4/2008 | Parupudi et al. |
| 7,397,424 B2 | 7/2008 | Houri |
| 7,450,954 B2 | 11/2008 | Randall |
| 7,493,565 B2 | 2/2009 | Parupudi et al. |
| 7,529,639 B2 | 5/2009 | Kikta et al. |
| 7,534,169 B2 | 5/2009 | Amaitis et al. |
| 7,611,407 B1 | 11/2009 | Itkis et al. |
| 7,753,772 B1 | 7/2010 | Walker et al. |
| 7,848,765 B2 | 12/2010 | Phillips et al. |
| 8,002,617 B1 | 8/2011 | Uskela et al. |
| 8,029,349 B2 | 10/2011 | Lind |
| 8,172,684 B2 | 5/2012 | Adiraju et al. |
| 8,403,755 B2 | 3/2013 | Kerr |
| 8,492,995 B2 | 7/2013 | Maxik et al. |
| 8,506,406 B2 | 8/2013 | Kerr |
| 8,506,407 B2 | 8/2013 | Kerr |
| 8,523,679 B2 | 9/2013 | Kerr |
| 8,738,024 B1 | 5/2014 | Kerr et al. |
| 8,747,229 B2 | 6/2014 | Kerr |
| 8,942,995 B1 | 1/2015 | Kerr |
| 9,043,222 B1 | 5/2015 | Kerr et al. |
| 9,262,596 B1 | 2/2016 | Steiner et al. |
| 9,349,128 B1 | 5/2016 | Kerr et al. |
| 2001/0004768 A1 | 6/2001 | Hodge et al. |
| 2001/0005908 A1 | 6/2001 | Hodge et al. |
| 2001/0031654 A1 | 10/2001 | Walker |
| 2001/0031656 A1 | 10/2001 | Marshall |
| 2001/0036224 A1 | 11/2001 | Demello et al. |
| 2001/0039210 A1 | 11/2001 | St-Denis |
| 2001/0044337 A1 | 11/2001 | Rowe |
| 2002/0002073 A1 | 1/2002 | Montgomery et al. |
| 2002/0007494 A1 | 1/2002 | Hodge |
| 2002/0034580 A1 | 3/2002 | Yang et al. |
| 2002/0056125 A1 | 5/2002 | Hodge et al. |
| 2002/0056143 A1 | 5/2002 | Hodge et al. |
| 2002/0061778 A1 | 5/2002 | Acres |
| 2002/0069105 A1 | 6/2002 | do Rosario Botelho et al. |
| 2002/0077130 A1 | 6/2002 | Owensby |
| 2002/0077167 A1 | 6/2002 | Merari |
| 2002/0091568 A1 | 7/2002 | Kraft et al. |
| 2002/0103028 A1 | 8/2002 | Carter et al. |
| 2002/0111210 A1 | 8/2002 | Luciano et al. |
| 2002/0111907 A1 | 8/2002 | Ling |
| 2002/0133707 A1 | 9/2002 | Newcombe |
| 2002/0142815 A1 | 10/2002 | Candelore |
| 2002/0142844 A1 | 10/2002 | Kerr |
| 2002/0142846 A1 | 10/2002 | Paulsen |
| 2002/0144151 A1 | 10/2002 | Shell et al. |
| 2002/0174436 A1 | 11/2002 | Wu et al. |
| 2002/0198775 A1 | 12/2002 | Ryan |
| 2003/0009385 A1 | 1/2003 | Tucciarone et al. |
| 2003/0030666 A1 | 2/2003 | Najmi et al. |
| 2003/0032409 A1 | 2/2003 | Hutcheson et al. |
| 2003/0064805 A1 | 4/2003 | Wells |
| 2003/0119578 A1 | 6/2003 | Newson |
| 2003/0144017 A1 | 7/2003 | Inselberg |
| 2004/0023721 A1 | 2/2004 | Giobbi |
| 2004/0192438 A1 | 9/2004 | Wells et al. |
| 2004/0224757 A1 | 11/2004 | Yamamura et al. |
| 2005/0046608 A1 | 3/2005 | Schantz et al. |
| 2005/0048990 A1 | 3/2005 | Lauriol |
| 2005/0076210 A1 * | 4/2005 | Thomas ................ H04L 9/0866 713/165 |
| 2005/0085257 A1 | 4/2005 | Laird |
| 2005/0114212 A1 | 5/2005 | Carrez et al. |
| 2005/0136949 A1 | 6/2005 | Barnes, Jr. |
| 2005/0154646 A1 | 7/2005 | Chermesino |
| 2005/0159883 A1 | 7/2005 | Humphries et al. |
| 2005/0181804 A1 | 8/2005 | Misikangas et al. |
| 2005/0215233 A1 * | 9/2005 | Perera .................. H04W 12/06 455/411 |
| 2005/0246334 A1 | 11/2005 | Tao et al. |
| 2005/0261063 A1 | 11/2005 | Boyd et al. |
| 2006/0003830 A1 | 1/2006 | Walker et al. |
| 2006/0004627 A1 | 1/2006 | Baluja |
| 2006/0058102 A1 | 3/2006 | Nguyen et al. |
| 2006/0063575 A1 | 3/2006 | Gatto et al. |
| 2006/0064346 A1 | 3/2006 | Steenstra et al. |
| 2006/0125693 A1 | 6/2006 | Recker |
| 2006/0181411 A1 | 8/2006 | Fast et al. |
| 2006/0184417 A1 | 8/2006 | Linden et al. |
| 2006/0189382 A1 | 8/2006 | Muir et al. |
| 2006/0194633 A1 | 8/2006 | Paulsen |
| 2006/0238382 A1 | 10/2006 | Kimchi et al. |
| 2006/0240891 A1 | 10/2006 | Klinkhammer et al. |
| 2006/0270421 A1 | 11/2006 | Phillips et al. |
| 2006/0287810 A1 | 12/2006 | Sadri et al. |
| 2007/0008108 A1 | 1/2007 | Schurig et al. |
| 2007/0008925 A1 | 1/2007 | Dravida et al. |
| 2007/0024580 A1 | 2/2007 | Sands et al. |
| 2007/0025265 A1 | 2/2007 | Porras et al. |
| 2007/0060306 A1 | 3/2007 | Amaitis et al. |
| 2007/0061229 A1 | 3/2007 | Ramer et al. |
| 2007/0087834 A1 | 4/2007 | Moser et al. |
| 2007/0100963 A1 | 5/2007 | Ban et al. |
| 2007/0136132 A1 | 6/2007 | Weiser et al. |

(56) References Cited

U.S. PATENT DOCUMENTS

| | | |
|---|---|---|
| 2007/0149215 A1 | 6/2007 | Misikangas |
| 2007/0149216 A1 | 6/2007 | Misikangas |
| 2007/0167210 A1 | 7/2007 | Kelly et al. |
| 2007/0168127 A1 | 7/2007 | Zaruba et al. |
| 2007/0184852 A1 | 8/2007 | Johnson et al. |
| 2007/0218975 A1 | 9/2007 | Iddings et al. |
| 2007/0243925 A1 | 10/2007 | LeMay et al. |
| 2007/0244633 A1 | 10/2007 | Phillips et al. |
| 2007/0257831 A1 | 11/2007 | Mathews et al. |
| 2007/0270212 A1 | 11/2007 | Cockerille et al. |
| 2007/0281692 A1 | 12/2007 | Bucher et al. |
| 2008/0026844 A1 | 1/2008 | Wells |
| 2008/0032705 A1 | 2/2008 | Patel et al. |
| 2008/0039192 A1 | 2/2008 | Laut |
| 2008/0057894 A1 | 3/2008 | Aleksic et al. |
| 2008/0076572 A1 | 3/2008 | Nguyen et al. |
| 2008/0085692 A1 | 4/2008 | Hart et al. |
| 2008/0096659 A1 | 4/2008 | Kreloff et al. |
| 2008/0097858 A1 | 4/2008 | Vucina et al. |
| 2008/0102947 A1 | 5/2008 | Hays et al. |
| 2008/0108430 A1 | 5/2008 | Evans |
| 2008/0113785 A1 | 5/2008 | Alderucci et al. |
| 2008/0153515 A1 | 6/2008 | Mock et al. |
| 2008/0162037 A1 | 7/2008 | Mahmoud |
| 2008/0166973 A1 | 7/2008 | Hart et al. |
| 2008/0167106 A1 | 7/2008 | Lutnick et al. |
| 2008/0176583 A1 | 7/2008 | Brachet et al. |
| 2008/0186234 A1 | 8/2008 | Alles et al. |
| 2008/0189360 A1 | 8/2008 | Kiley et al. |
| 2008/0207296 A1 | 8/2008 | Lutnick et al. |
| 2008/0227473 A1 | 9/2008 | Haney |
| 2008/0249833 A1 | 10/2008 | Ali et al. |
| 2008/0252527 A1 | 10/2008 | Garcia |
| 2008/0281668 A1 | 11/2008 | Nurminen |
| 2009/0018929 A1 | 1/2009 | Weathers |
| 2009/0150217 A1 | 6/2009 | Luff |
| 2009/0170614 A1 | 7/2009 | Herrmann et al. |
| 2009/0197684 A1 | 8/2009 | Arezina et al. |
| 2009/0213771 A1 | 8/2009 | Celentano et al. |
| 2009/0214036 A1 | 8/2009 | Shen et al. |
| 2009/0254824 A1 | 10/2009 | Singh |
| 2009/0298513 A1 | 12/2009 | Hampel et al. |
| 2009/0325708 A9 | 12/2009 | Kerr |
| 2010/0022308 A1 | 1/2010 | Hartmann et al. |
| 2010/0027521 A1 | 2/2010 | Huber et al. |
| 2010/0039929 A1 | 2/2010 | Cho et al. |
| 2010/0048242 A1 | 2/2010 | Rhoads et al. |
| 2010/0063854 A1 | 3/2010 | Purvis et al. |
| 2010/0121567 A1 | 5/2010 | Mendelson |
| 2010/0167771 A1 | 7/2010 | Raghothaman et al. |
| 2010/0179885 A1 | 7/2010 | Fiorentino |
| 2010/0280960 A1 | 11/2010 | Ziotopoulos et al. |
| 2010/0287033 A1 | 11/2010 | Mathur |
| 2010/0287052 A1 | 11/2010 | Minter et al. |
| 2010/0302056 A1 | 12/2010 | Dutton et al. |
| 2010/0305855 A1 | 12/2010 | Dutton et al. |
| 2010/0331016 A1 | 12/2010 | Dutton et al. |
| 2011/0078167 A1 | 3/2011 | Sundaresan et al. |
| 2011/0103360 A1 | 5/2011 | Ku et al. |
| 2011/0159953 A1 | 6/2011 | Kerr |
| 2011/0165936 A1 | 7/2011 | Kerr |
| 2012/0008526 A1 | 1/2012 | Borghei |
| 2012/0115512 A1 | 5/2012 | Grainger et al. |
| 2012/0122476 A1 | 5/2012 | Lee et al. |
| 2013/0003572 A1 | 1/2013 | Kim et al. |
| 2014/0295944 A1 | 10/2014 | Faircloth |
| 2016/0157168 A1 | 6/2016 | Xue et al. |
| 2017/0178157 A1 | 6/2017 | Jayaram |

OTHER PUBLICATIONS

Internet Industry Interacting Gambling Code: A Code for Industry Co-Regulation in the Area of Internet Gambling Content Purs . . .
"Location in SIP/IP Core Architecture." Open Mobile Alliance. Sep. 4, 2008. Accessed Dec. 2008. http://www.openmobilealliance . . .
"The New Normal of Retailing: The Rise of the Mobile Shopper." Next Generation Retail Summit. 2010. http://www.ngrsummit.com/. . .
"Tracking Cookie," Wikipedia. http://en.wikipedia.org/wikiaracking.sub.—cookie. May 24, 2009.
"Wi-Fi Location-Based Services—Design and Deployment Considerations." 2006 Cisco Systems. Accessed Dec. 2008. https://learni . . .
"Wireless Network." Wikipedia. http://en.wikipedia.org/wiki/Wireless.sub.—network. Nov. 17, 2008.
Assad, Muhammad, A Real-Time Laboratory Testbed for Evaluating Localization Performance of WIFI RFID Technologies, May 4, 2007 . . .
Balakrishnan et al. "Lessons from Developing and Deploying the Cricket Indoor Location System." Nov. 7, 2003. http://www.sds . . .
Bensky, Alan, "Wireless Positioning Technologies and Applications", Artch House, Inc. (2008), 305 pages.
Blom et al. "Transmission Power Measurements for Wireless Sensor Nodes and their Relationship to Battery Level." Symposium on . . .
Borriello et al. "Delivering Real-World Ubiquitous Location Systems." Communications of the ACM. pp. 36-41, vol. 48, Issue 3, . . .
Capkun et al. "Mobility Helps Peer-to-Peer Security." IEEE Transactions on Mobile Computing. vol. 5, Issue 1, pp. 13-51, Jan . . .
Chawathe et al. "A Case Study in Building Layered DHT Applications." Proceedings of the 2005 conference on Applications, tech . . .
Chen et al. "Practical Metropolitan-Scale Positioning for GSM Phone." UbiComp 2006: Ubiquitous Computing Lecture Notes in Com . . .
Cheng et al. "Accuracy Characterization for Metropolitan-scale Wi-Fi Localization." Proceedings of the 3rd international conf . . .
Heidari, Mohannad. A Testbed for Real-Time Performance Evaluation of RSS-Based Indoor Geolocation Systems in a Laboratory En . . .
Hightower et al. "Practical Lessons from the Place Lab." IEEE Pervasive Computing. pp. 32-39, vol. 5, Issue 3, Jul.-Sep. 2006 . . .
Hile et al. "Indoor Location Estimation with Placelab." http://www.cs.washington.edu/education/courses/cse590gb/04wi/ projects . . .
ISA/US, International Search Report and Written Opinion for PCT/US14/029303, dated Aug. 22, 2014, 12 pages.
ISA/US, International Search Report and Written Opinion for PCT/US15/044680, dated Dec. 14, 2015, 10 pages.
Kang "Extracting Places from Traces of Locations." ACM Sigmobile Mobile Computing and Communications Review. vol. 9, Issue 3, Jul. 2005.
Kitasuka et al. "Positioning Technique of Wireless LAN Terminal Using RSSI between Terminals". Jun. 2005. Accessed Dec. 2008 . . .
Ladd et al. "On the Feasibility of Using Wireless Ethernet for Indoor Localization." IEEE Transactions on Robotics and Automa . . .
Ladd et al. "Using Wireless Ethernet for Localization." IEEE/RJS International Conference on Intelligent Robots and Systems . . .
Lafargue, Edouard. "Wireless Network Audits using Open Source Tools". SANS Institute 2003. Accessed Dec. 2008. ittp://www.san . . .
Lamarca et al. Finding Yourself: Experimental location technology relies on Wi-Fi and cellphone signals instead of orbiting . . .
Lamarca et al. "Place Lab: Positioning Using Radio Beacons in the Wild." Pervasive 2005, LNCS 3468, pp. 116-133, 2005. cited . . .
Lamarca et al. "Self-Mapping in 802.11 Location Systems." UbiComp 2005: Ubiquitous Computing Lecture Notes in Computer Scienc . . .
Letchner et al. "Large-Scale Localization from Wireless Signal Strength." in Proceedings of the National Conference on Artifi . . .
Li et al. "A New Method for Yielding a Database of Location Fingerprints in WLAN" IEE Communications Proceedings, pp. 580-586 . . .

(56) References Cited

OTHER PUBLICATIONS

Milojicic et al. "Peer-to-Peer Computing" Jul. 10, 2002. https://www.hpl.hp.com/techreports/2002/HP-2002-57R1.pdf. . . .

Muthukrishnan, et al. "Sensing motion using spectral and spatial analysis of WLAN RSSI." Proceedings of the 2nd European conf . . .

Otsason et al. "Accurate GSM Indoor Localization." Ubiquitous Computing 2005, LNCS 3660, pp. 141-158, 2005. . . .

Sakata et al. "An efficient algorithm for Kriging approximation and optimization with large-scale sampling data". Computer Me....

Schilit et al. "Challenge: Ubiquitous Location-Aware Computing and the "Place Lab" Initiative." Wmash Proceedings of. The 1st . . .

Varshaysky et al. "Are GSM Phones the Solution for Localization?" 7th IEEE Workshop on Mobile Computing Systems and Applicati . . .

Vegni et al. "Local Positioning Services on IEEE 802.11 Networks," Radio Engineering, pp. 42-47, vol. 17, No. 2, Jun. 2008 . . .

Want et al. "The Active Badge Location System." ACM Transactions on Office Information Systems (TOIS) vol. 10. No. 1, pp. 91- . . .

Welbourne et al. "Mobile Context Inference Using Low-Cost Sensors." Location and Context-Awareness Lecture Notes in Computer . . .

Youssef et al. "Location-Clustering Techniques for WLAN Location Determination Systems." 2006. http://wrc.ejust.edu.eg/papers . . .

\* cited by examiner ns of data files. More specifically, the present invention

MULTI-CHANNEL COMMUNICATION OF DATA FILES

CROSS-REFERENCE

This patent application claims the benefit of provisional patent application 62/036,278 entitled CONTEXT AWARE BEACON ARCHITECTURE and filed on Aug. 12, 2014; and the above patent application is hereby incorporated by reference in this patent application.

This patent application is a continuation-in-part of patent application Ser. No. 13/153,214 entitled MERCHANT CONTROLLED PLATFORM SYSTEM AND METHOD filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

This patent application is a continuation-in-part of patent application Ser. No. 13/153,238 entitled MERCHANT CONTROL PLATFORM SYSTEM AND METHOD WITH LOCATION-BASED CONTENT DELIVERY filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

This patent application is a continuation-in-part of patent application of patent application Ser. No. 13/153,248 entitled LOCATION POSITIONING ENGINE SYSTEM AND METHOD filed on Jun. 3, 2011 that claims the benefit of the benefit of provisional patent application 61/351,677 filed on Jun. 4, 2010, provisional patent application 61/351,770 filed on Jun. 4, 2010, and provisional patent application 61/352,242 filed on Jun. 7, 2010;

This patent application is a continuation-in-part of patent application Ser. No. 14/189,905 entitled NETWORK BASED INDOOR POSITIONING AND GEOFENCING SYSTEM AND METHOD filed on Feb. 25, 2014, which is a Continuation of patent application Ser. No. 12/821,852 (now U.S. Pat. No. 8,738,024) entitled DELIVERING CONTENT WITHIN A BOUNDARY WITH BEACONS filed on Jun. 23, 2010 that claims the benefit of provisional patent application 61/223,565 filed on Jul. 7, 2009;

This patent application is a continuation-in-part of patent application Ser. No. 12/413,547 entitled MOBILE AUTONOMOUS DYNAMIC GRAPHICAL USER INTERFACE filed on Mar. 28, 2009 that claims the benefit of provisional patent application 61/040,661 filed on Mar. 29, 2008;

This patent application is a continuation in part of non-provisional patent application Ser. No. 11/948,007 entitled PLAYER TRACKING USING A WIRELESS DEVICE FOR A CASINO PROPERTY filed on Nov. 30, 2007 that claims the benefit of provisional patent application 60/872,351 filing Nov. 30, 2006;

This patent application is a continuation-in-part of non-provisional application Ser. No. 14/189,918 entitled NETWORKING GAMING SYSTEM AND METHOD filed on Feb. 25, 2014 which is a Continuation of patent application Ser. No. 12/981,403 (now U.S. Pat. No. 8,747,229) filed on Dec. 29, 2010 that is entitled GAMING SYSTEM NETWORK AND METHOD FOR DELIVERING GAMING MEDIA, which is a Continuation of patent application Ser. No. 10/681,034 (now U.S. Pat. No. 8,403,755) filed on Oct. 8, 2003 that is entitled WIRELESS BROADBAND GAMING SYSTEM AND METHOD, which is a Continuation of patent application Ser. No. 09/899,559 (now abandoned) filed on Jul. 5, 2001 that is entitled BIOMETRIC BROADBAND GAMING SYSTEM AND METHOD, which claims the benefit of provisional patent application Ser. No. 06/266,956 filed on Feb. 6, 2001; and the above patent applications are hereby incorporated by reference in this patent application.

FIELD

The present invention relates to multi-channel communications of data files. More specifically, the present invention is related to communicating encrypted content to a first networked device along a first communication channel and a decryption key to a second networked device along a second communication channel, wherein the first networked device and the second networked device are both within an indoor geofence.

BACKGROUND

The efficacy of mobile marketing depends on the ability to tune noise out and deliver relevant content. Imparting relevance is difficult because context is inextricably linked to location. To be truly effective, mobile applications must be smart enough to discern that a user searching for an "apple" in a grocery store likely requires a fruit and not an iPhone.

Prior to the emergence of the first player tracking systems at the end of the millennium, gaming operators relied on casino hosts to cultivate and maintain personal relationships with customers. With the explosion of the megaresorts that followed the opening of the Mirage in 1989, it became exponentially more challenging to build relationships with customers.

Fundamentally, player tracking supported the ability to track play in a more effective and efficient manner, which afforded casino operators the opportunity to triage their clientele and devote more resources to their most profitable players. Although tracking systems have grown more complex, it is still difficult for resorts to engage their customers once they're inside the casino because these antiquated systems are two dimensional. Some of the more savvy operators have experimented with social media as a method of making these systems more interactive, but with limited success. Operators are still learning how to prioritize content, and consumers are often overloaded with content. Worse, pushing ads with little or no relevance results in users' deleting their mobile apps.

In a highly commoditized industry like gaming, content providers must strive even harder to ensure their content has context that differentiates themselves from their competitors. Despite all the technological advancements in the gaming industry over the last 120 years, the vast majority of growth has been driven by expansion of brick and mortar casinos: more devices, more casinos. Technologies that deliver meaningful contextual awareness will be the primary driver of gaming revenues for the foreseeable future.

SUMMARY

A system and method for multi-channel communications of data files is described. The system and method communicate secure content to a networked client device and a wireless device. The system includes a storage network cloud component, a registration cloud component, an encryption network cloud component, a first communication path between the encryption network cloud component and the networked client device, a second network communication path between the encryption network cloud component and the wireless device, and a third network communication path between the wireless device and the networked client device.

The storage network cloud component stores a plurality of data files in a storage network cloud component. The registration cloud component registers the networked client device(s). The networked client device is disposed in a location that includes at least one beacon that generates a beacon identifier so that the beacon identifier is included in the registration of the networked client device. The wireless device is registered at the registration cloud component.

The encryption network cloud component generates an encrypted data file from a data file. Additionally, the encryption network cloud component is communicatively coupled to the storage network cloud component. A decryption key that is associated with the encrypted data file is also generated by the encryption network cloud component.

The first network communication path between the encryption network cloud component and the networked client device communicates the encrypted data file to the registered networked client device. The second network communication path between the encryption network cloud component and the wireless device that communicates the decryption key to the registered wireless device. The third network communication path between the wireless device and the networked client device communicates the decryption key from the wireless device to the networked client device, when the wireless device is within proximity of the networked client device.

The proximity of the wireless device to the networked client device is determined by having the wireless device detect a beacon identifier associated with the networked client device. The encrypted data file on the networked client device is decrypted with the decryption key transmitted by the wireless device.

In one embodiment, a decryption key acknowledgement is generated when the decryption key is received by the client. The decryption key acknowledgement is communicated from the networked client device to the encryption network cloud component, which records that the decryption key that was communicated to the wireless device was received by the networked client device.

In another illustrative embodiment, the first communication path includes a local area network that supports the networked client device being communicatively coupled to a firewall that is communicatively coupled to each network cloud component along a wide area network. The second communication path includes a wireless carrier network operating a high bandwidth wireless protocol supports communications between the wireless device and each networked cloud component. The third communication path includes a localized wireless communication protocol that supports communications between the wireless device and the networked client device.

In yet another illustrative embodiment, the system includes an autonomous dynamic graphical user interface that is communicated to the wireless device. The autonomous dynamic graphical user interface includes a plurality of targeted content items that are filtered based on user profile and indoor location. Additionally, at least one of a plurality of targeted content items is associated with a targeted content item decryption key. The autonomous dynamic graphical user interface embodiment may further include a received user input associated with one of the targeted content items that triggers transmitting a selected content item decryption key from the wireless device to the networked client device.

A further embodiment includes an indoor geofence that is associated with networked client device so that the wireless device receives the decryption key corresponding to encrypted data file received by the networked client device, when the wireless device is within the indoor geofence.

In an even further illustrative embodiment, the encrypted data file includes a plurality of animated images associated with a game that operates within the geofence so that a game session is initiated when the wireless device is the within the geofence associated with the networked client device. In a further still illustrative embodiment, the encrypted animated images are communicated from the networked client device to the wireless device, when the wireless device is within the geofence associated with the networked client. Further yet, the decryption key may be communicated to the wireless device, when the wireless device is within the geofence associated with the networked client device. Additionally, the decryption key is removed from the wireless device, when the wireless device is outside the indoor geofence.

FIGURES

The present invention will be more fully understood by reference to the following drawings which are for illustrative, not limiting, purposes.

Figure 4A:
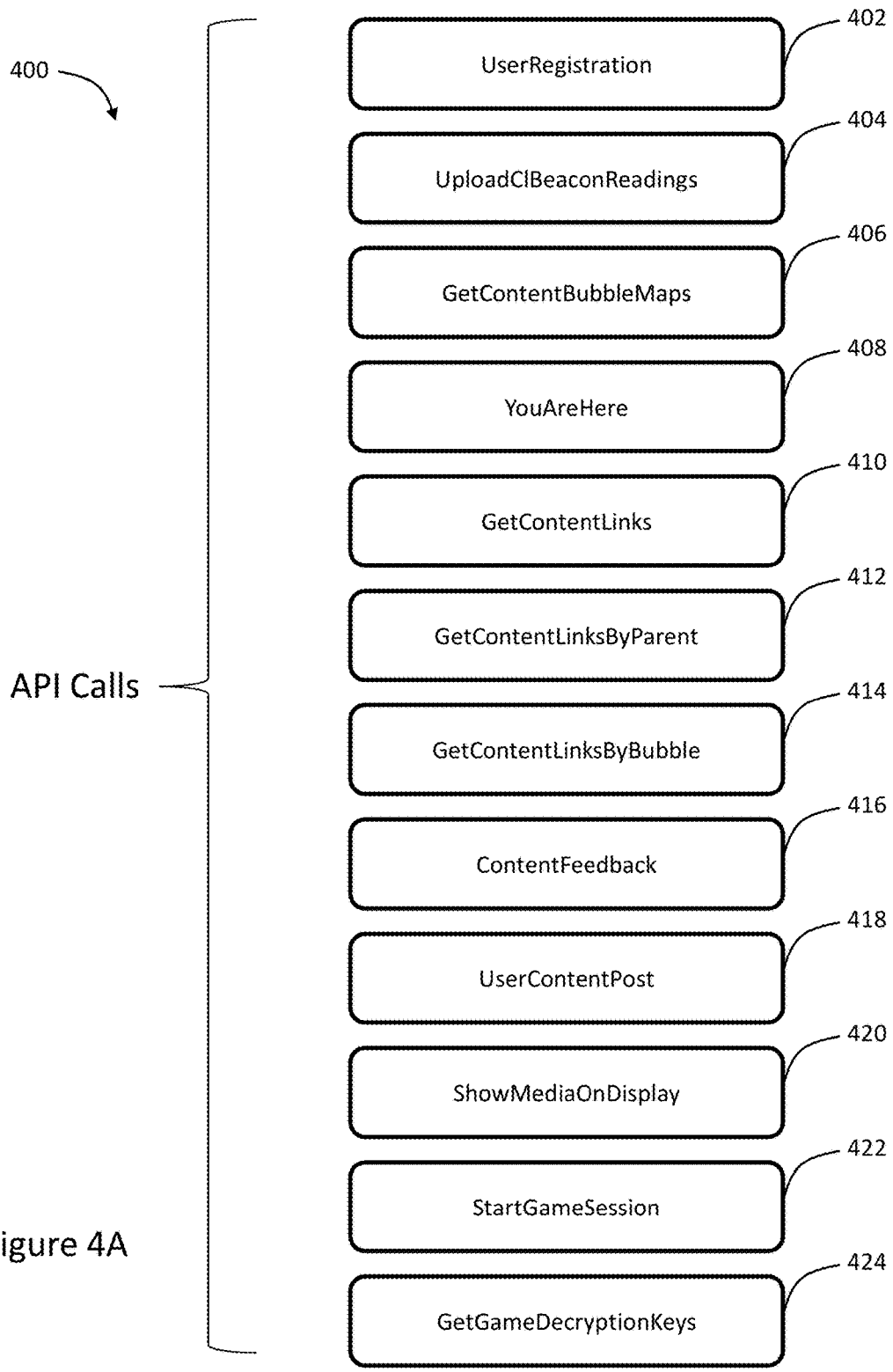
FIG. 4A shows an illustrative group of API calls for the client device.
Figure 4B:
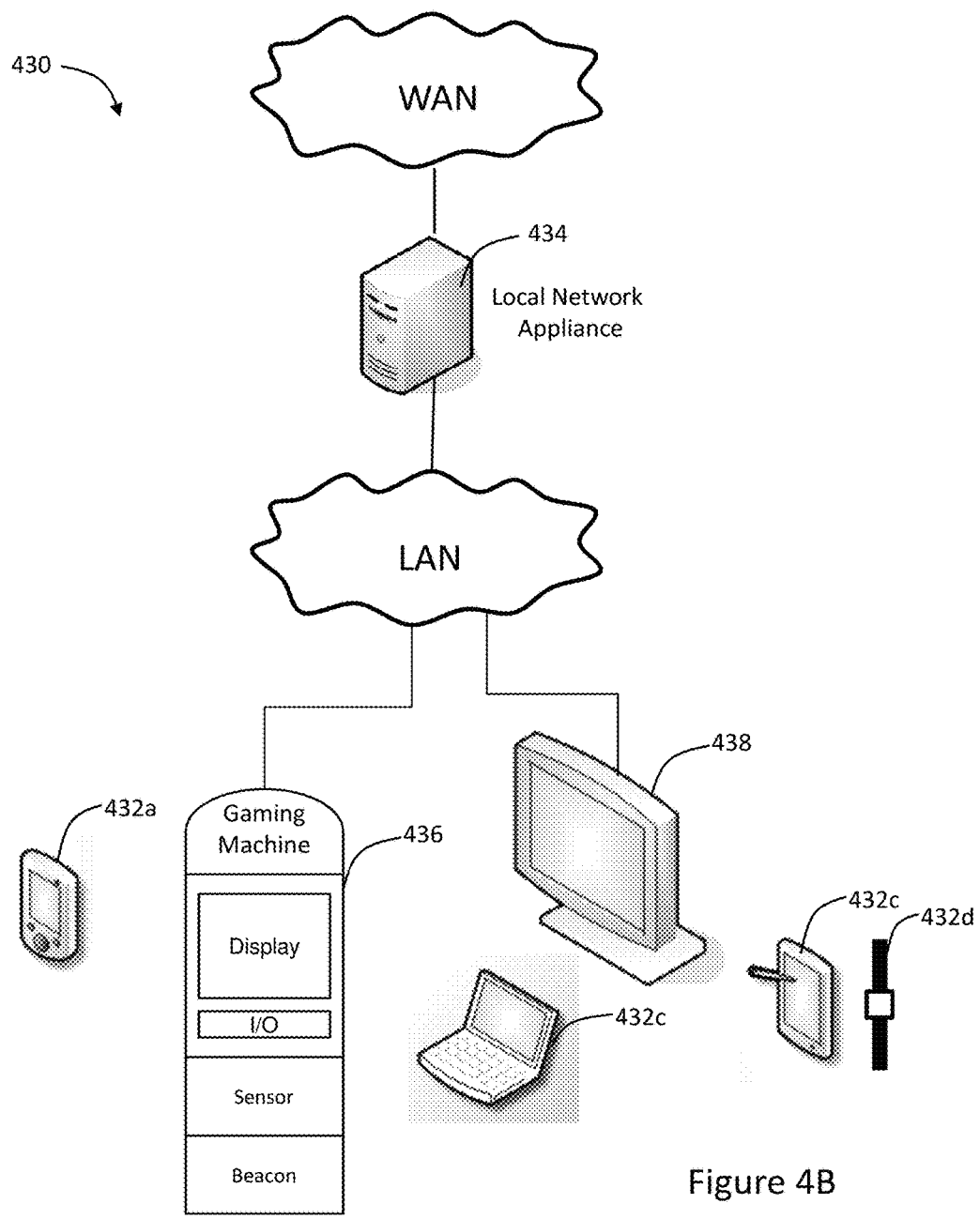

FIG. 4B presents an illustrative tournament game system for the illustrative social slot machine presented in FIGS. 13-14 below.

Figure 4C:
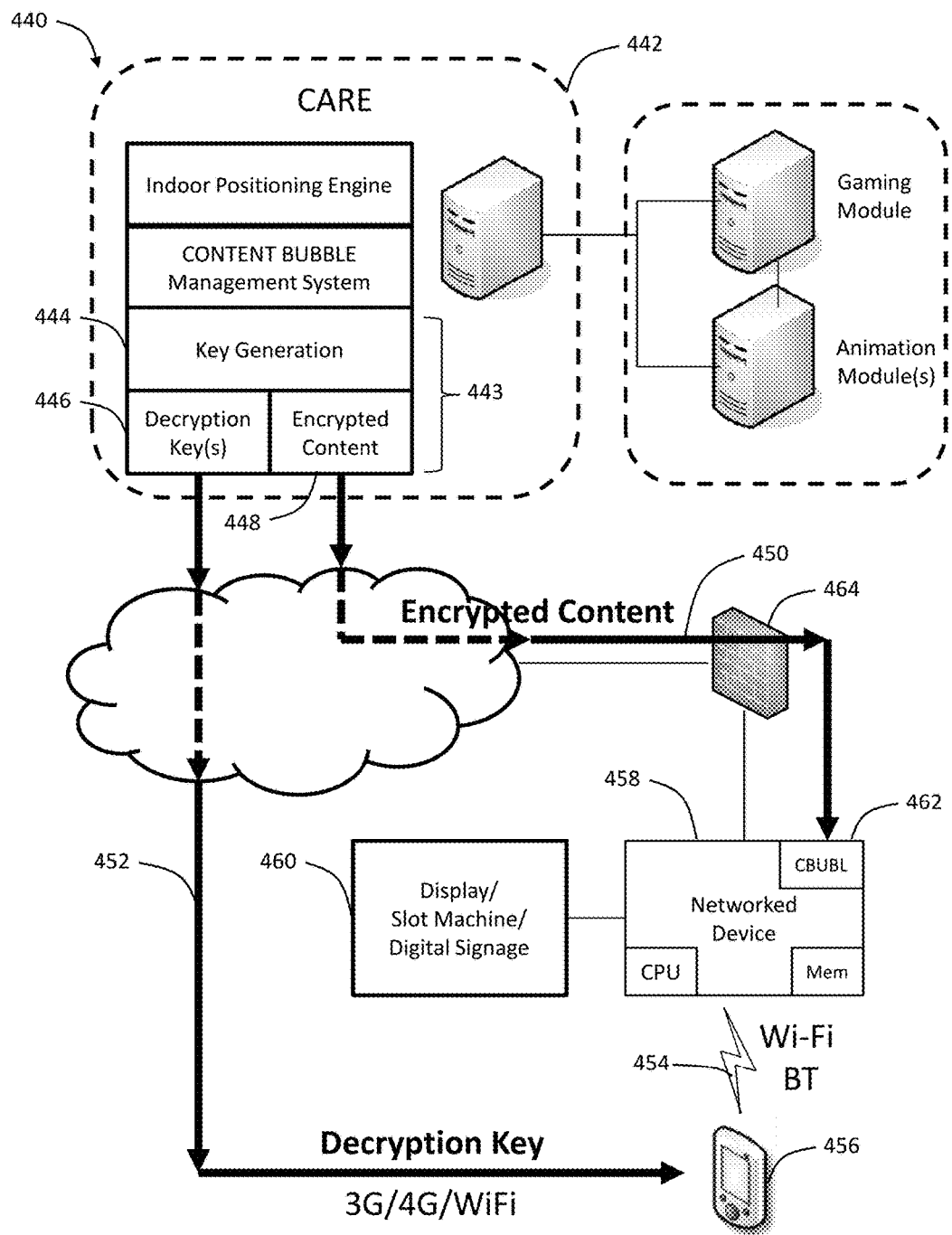

FIG. 4C shows a system for communicating an encrypted data file to a networked client device and a decryption key to a wireless device.

Figure 4D:
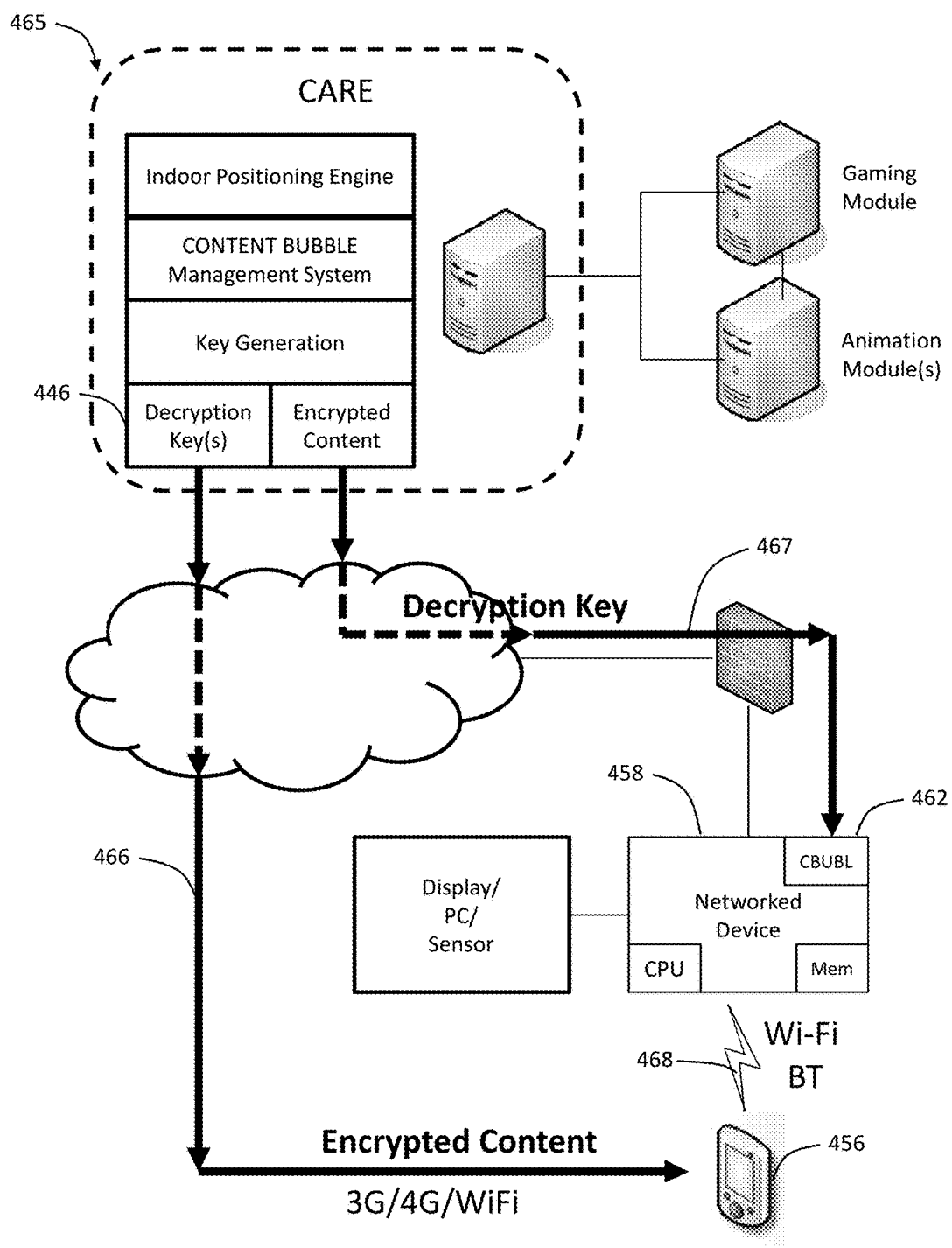

FIG. 4D shows a system for communicating a decryption key to a networked client device and an encrypted data file to a wireless device.

Figure 4E:
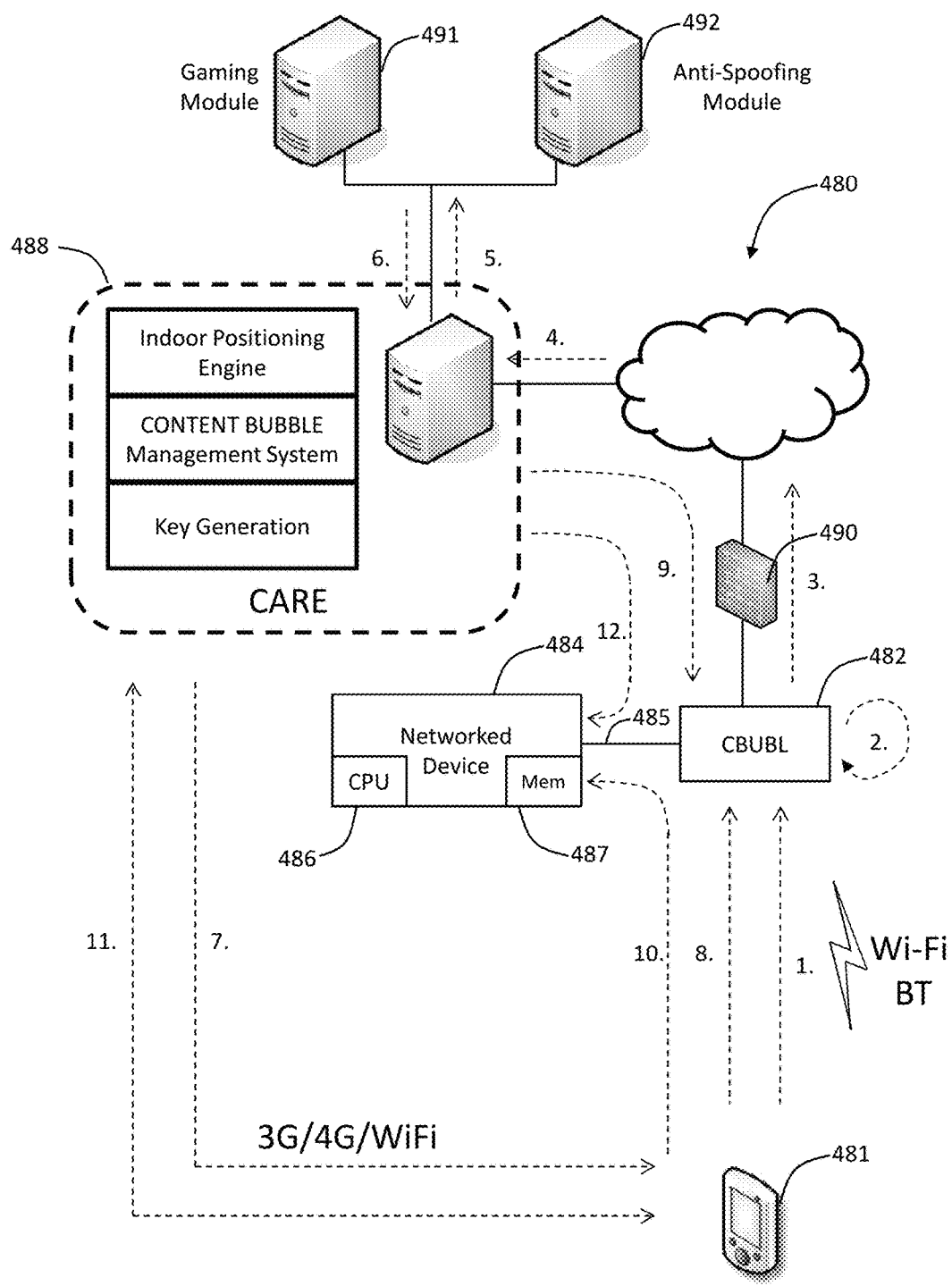

FIG. 4E shows an illustrative system for automatically identifying valid wireless devices and for communicating encrypted content.

Figure 5:
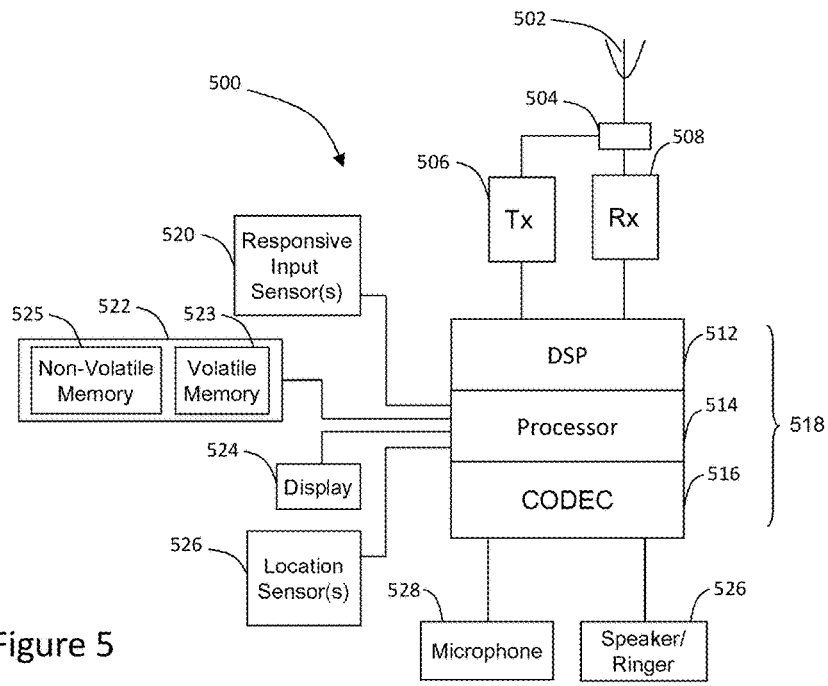

FIG. 5 shows the electrical components for an illustrative wireless device.

Figure 6:
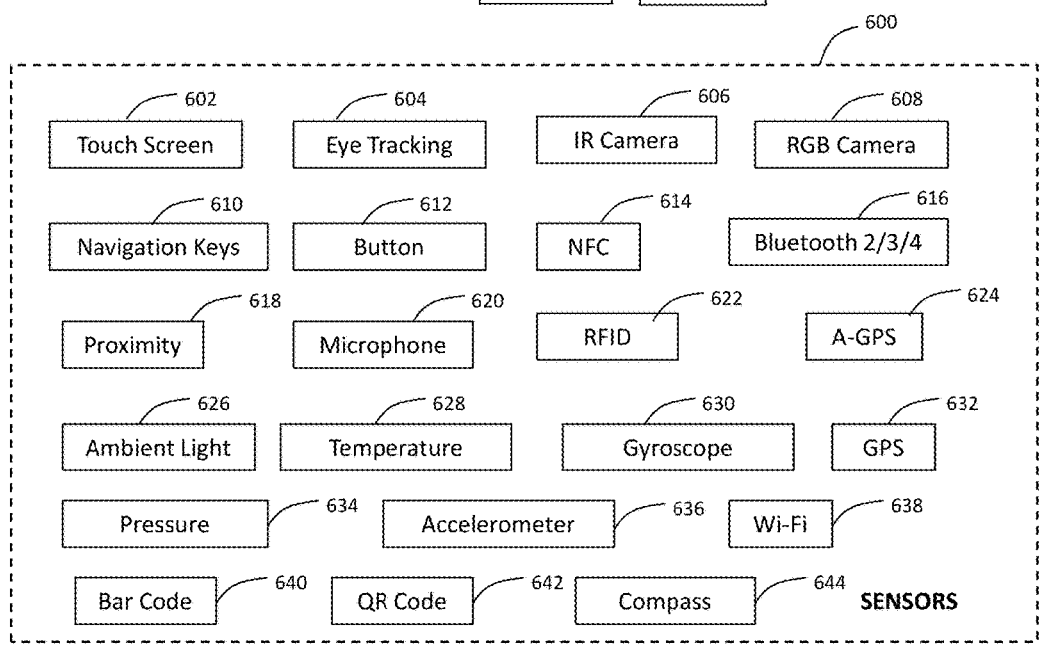

FIG. 6 shows a plurality of sensors that can be used to receive a responsive input that is communicated to the CARE platform.

Figure 7:
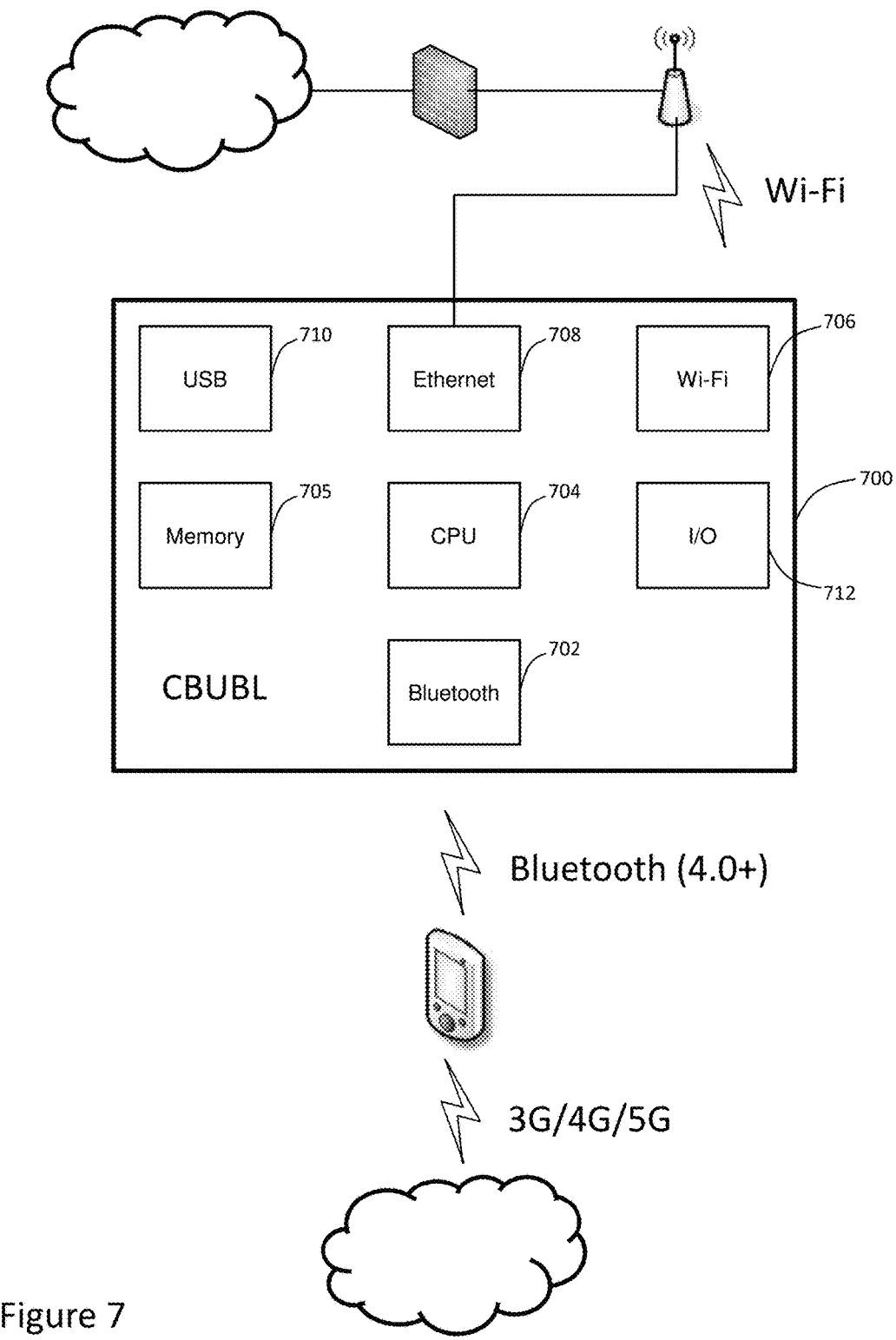

FIG. 7 shows an illustrative system, in which the CARE platform delivers the dynamic portal content to an illustrative wireless device and enables the wireless device to control a display.

Figure 8:
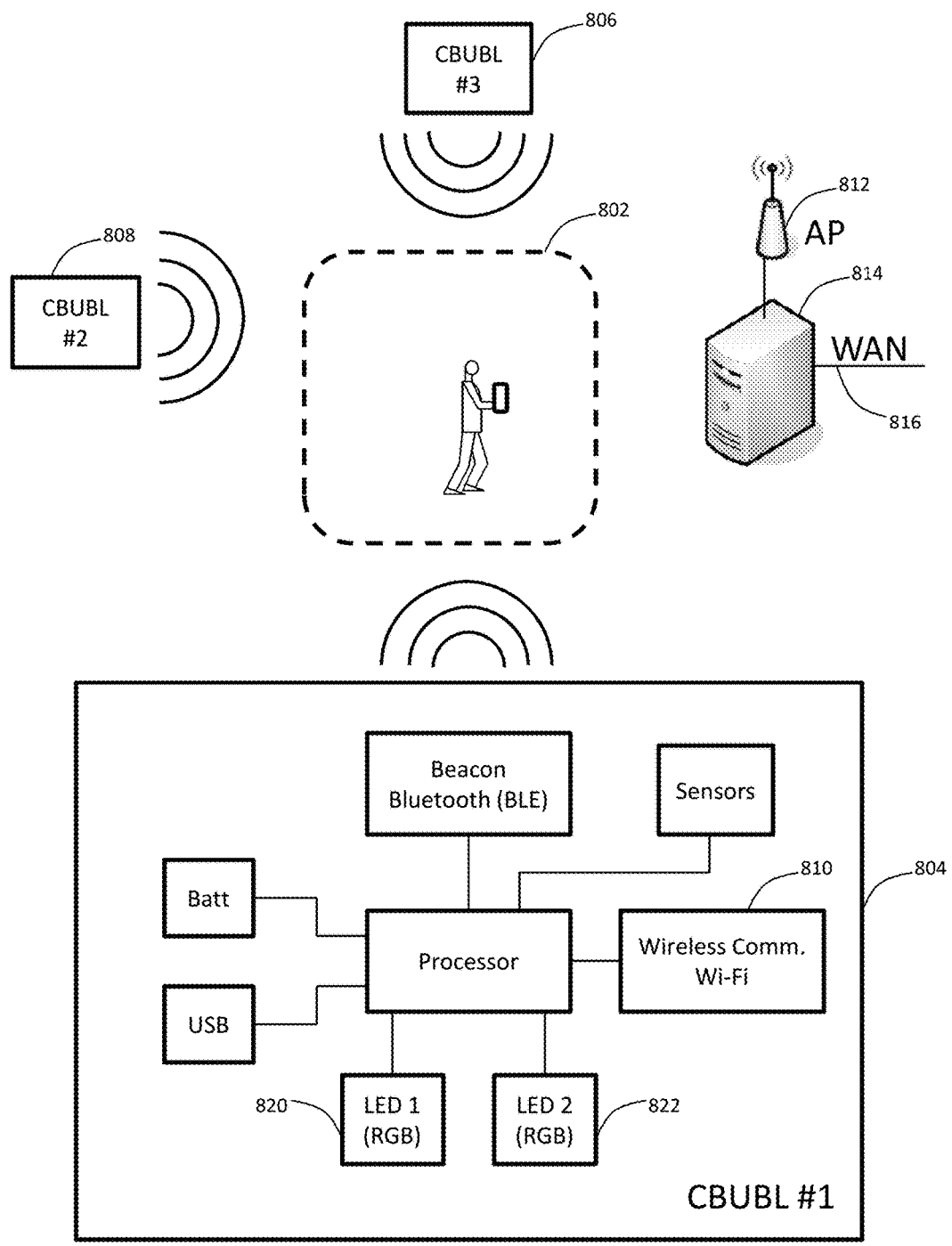

FIG. 8 shows an illustrative system, in which the wireless client device generates the dynamic portal.

Figure 9:
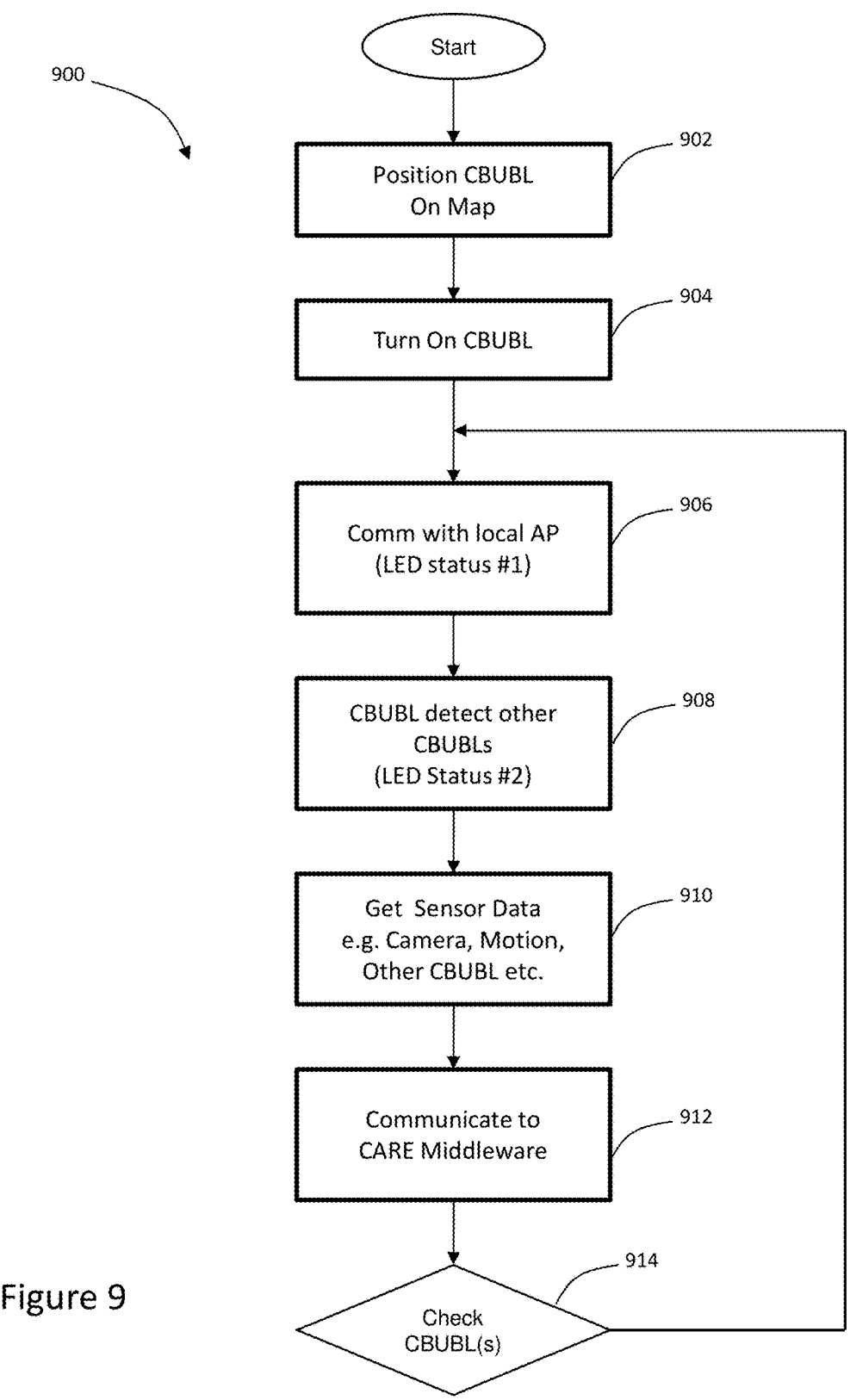

FIG. 9 shows an illustrative system where an illustrative gaming machine or digital signage generates the dynamic MADGUI portal and communicates the MADGUI to the server, which then passes the MADGUI to the wireless device.

Figure 10A:

FIG. 10A shows a home page for a web-based interface that allows the customer to configure the CARE system.

Figure 10B:

FIG. 10B shows a user interface for building a property map that is associated with the property bubble.

Figure 10C:
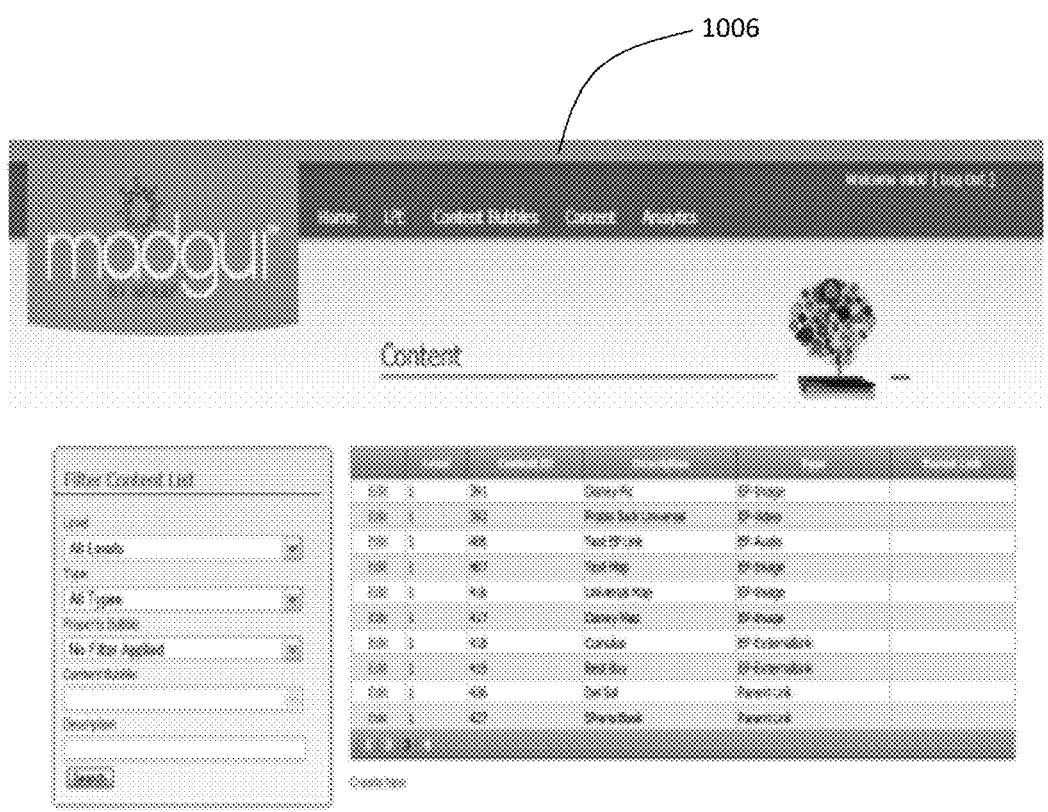

FIG. 10C shows a user interface that enables content bubbles to be populated with content and related content links.

Figure 10D:
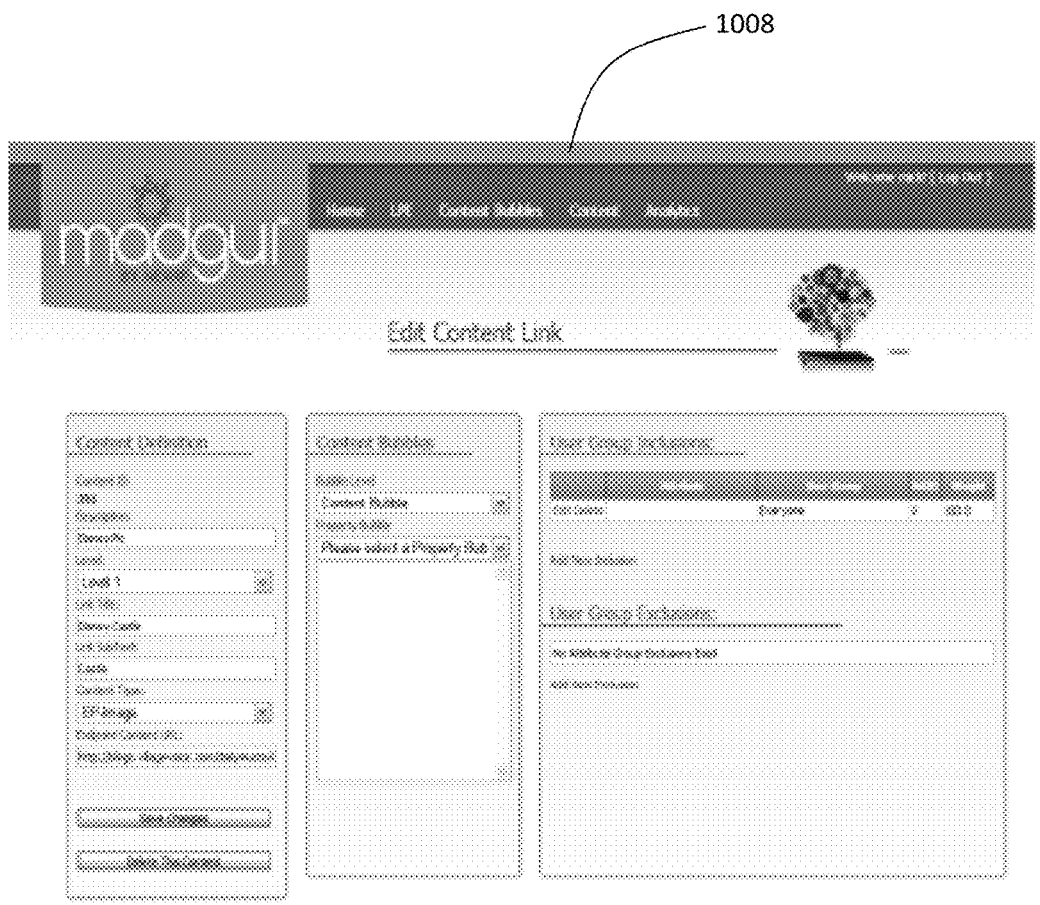

FIG. 10D shows the user interface that includes a variety of link types that can be associated with content which is communicated to the wireless device.

Figure 10E:
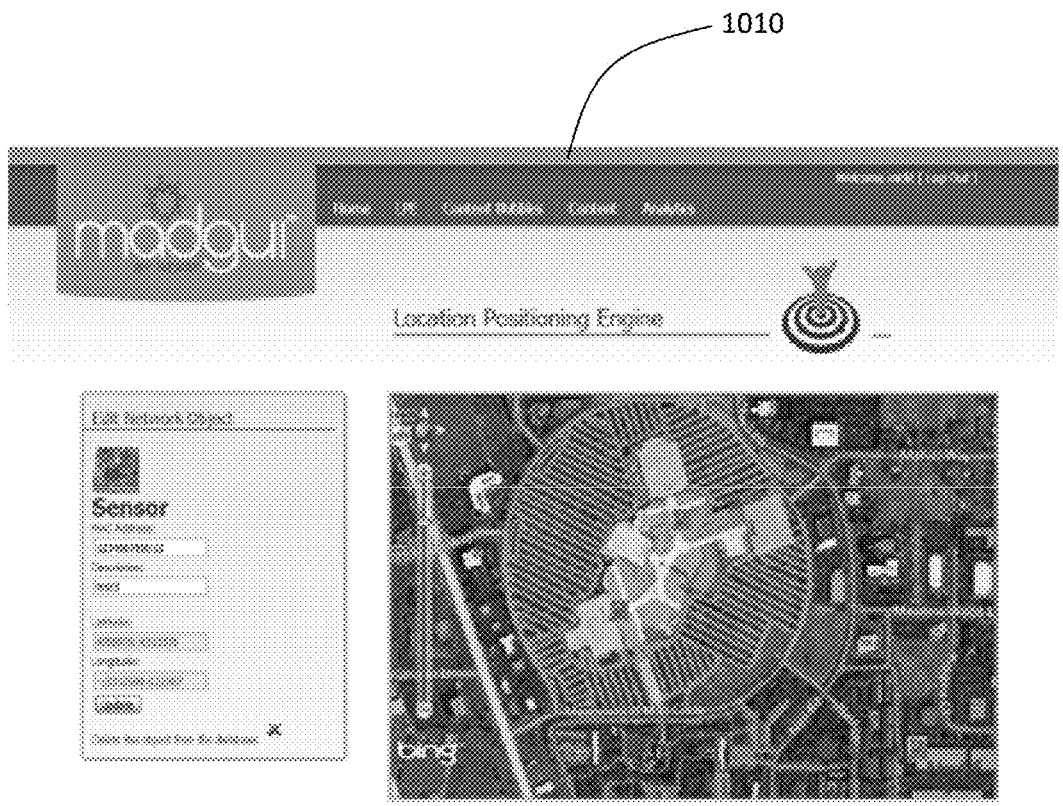

FIG. 10E shows a site survey user interface which is used to build a geospatial interpolation model referred to as "kriging."

Figure 10F:
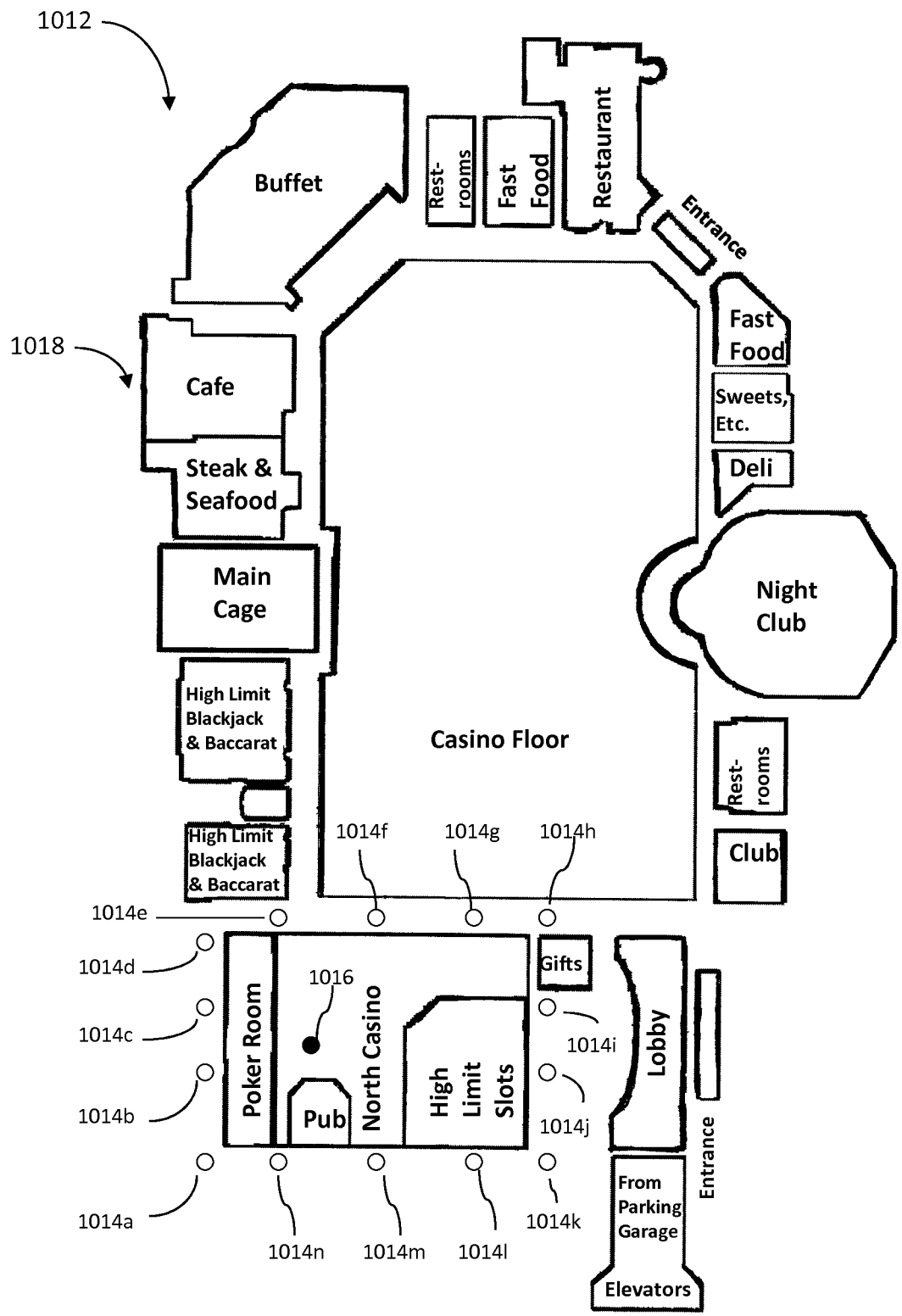

FIG. 10F shows an indoor map having a plurality of beacons surrounding a particular area.

Figure 11A:
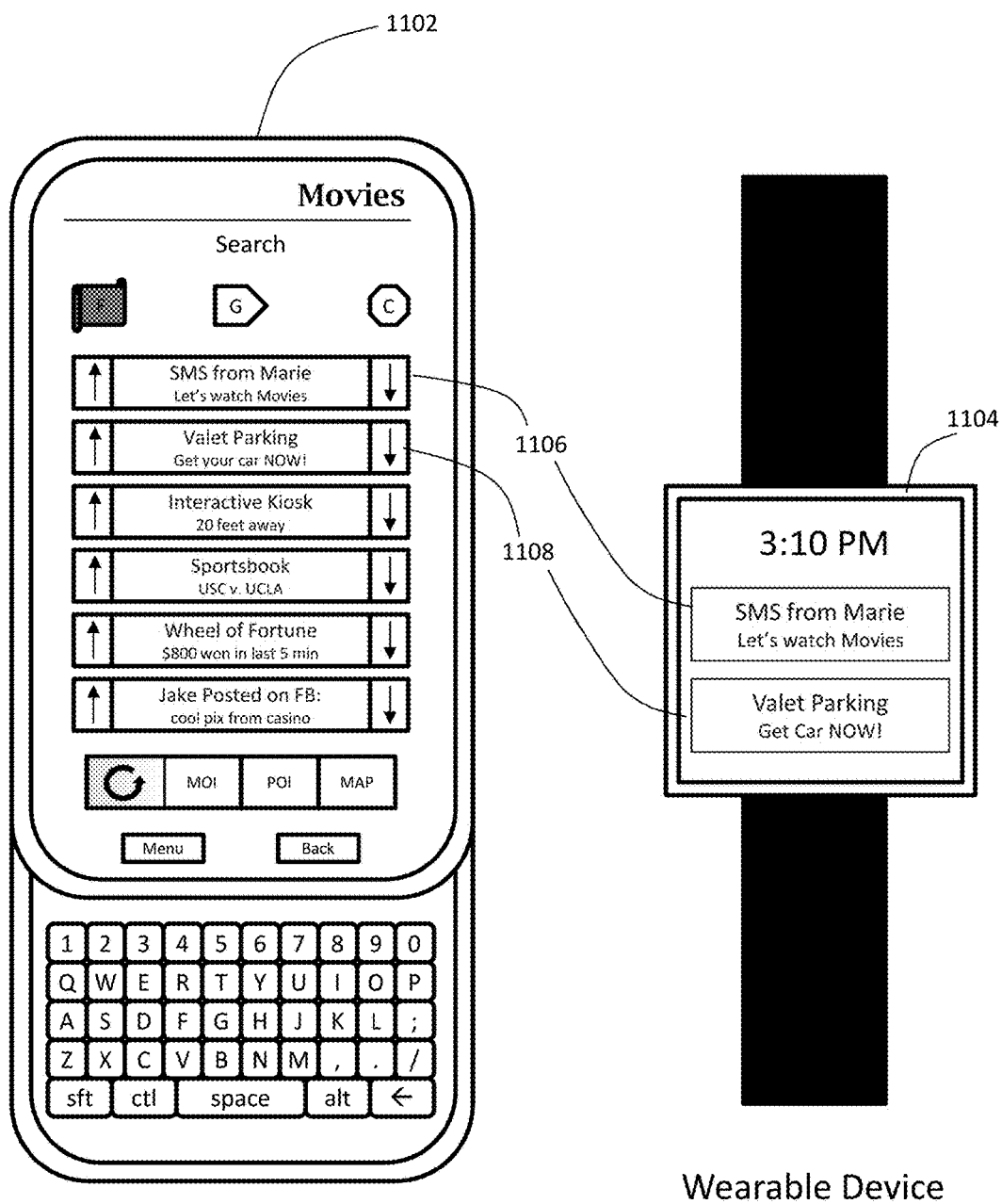

FIG. 11A shows an illustrative dynamic portal associated with the MADGUI that may also be integrated with a wearable device.

Figure 11B:
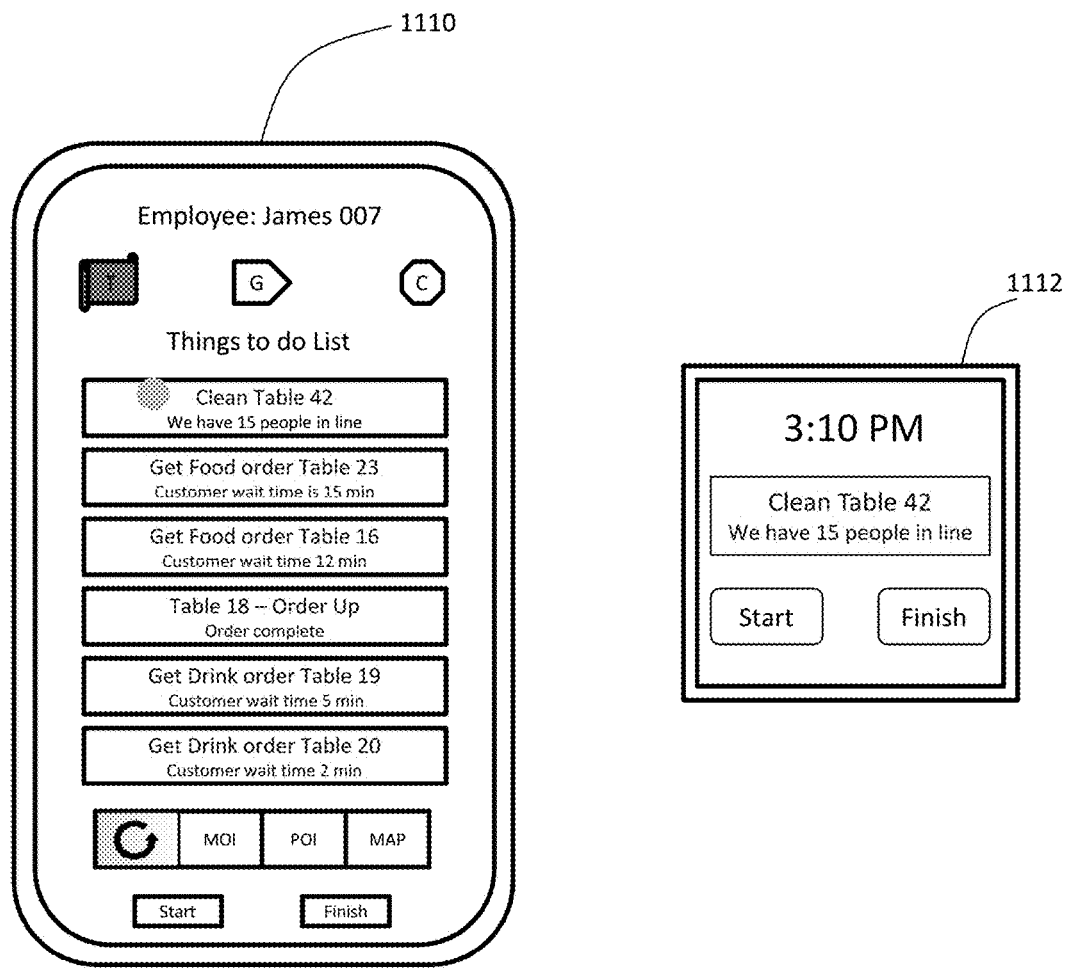

FIG. 11B shows an illustrative UI for a service employee that utilizes a smartphone in combination with a wearable device.

Figure 11C:
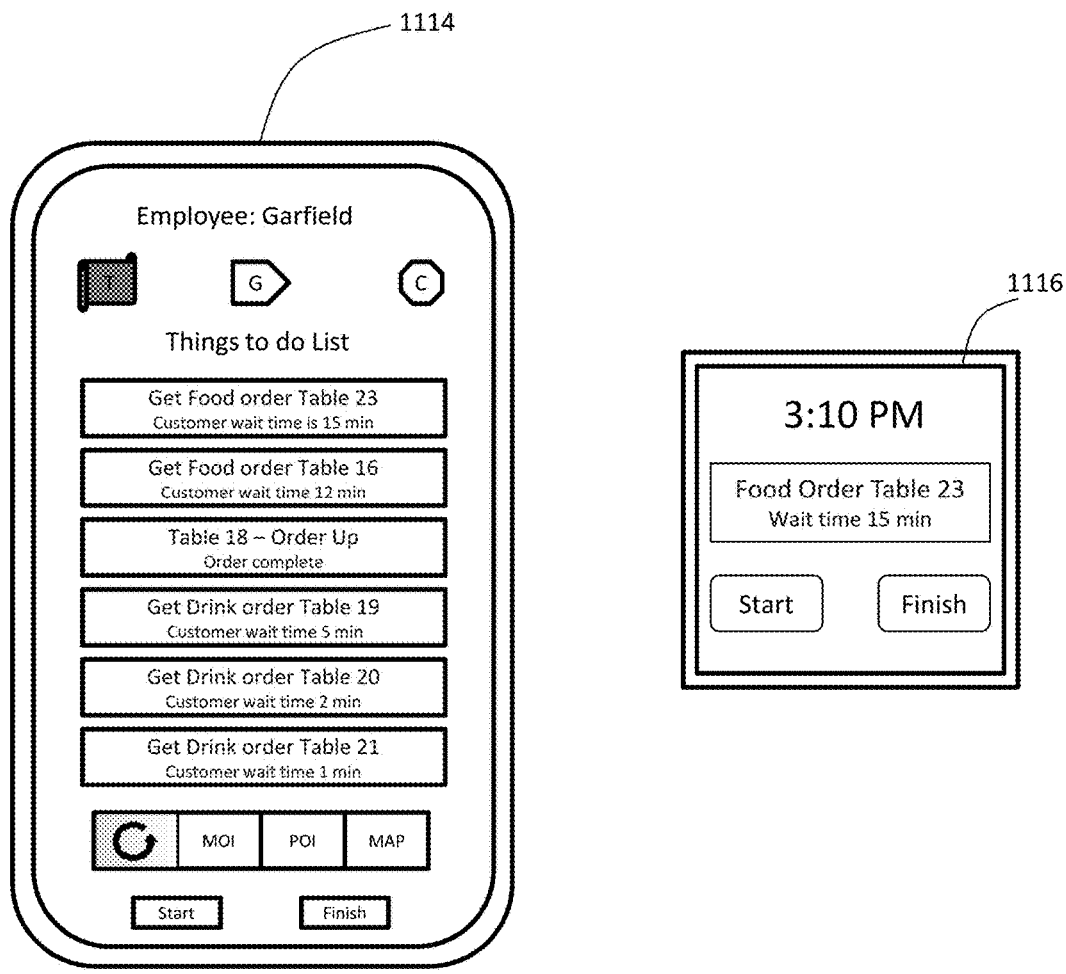

FIG. 11C shows an illustrative UI for a second service employee that utilizes a smartphone in combination with a wearable device.

Figure 12:
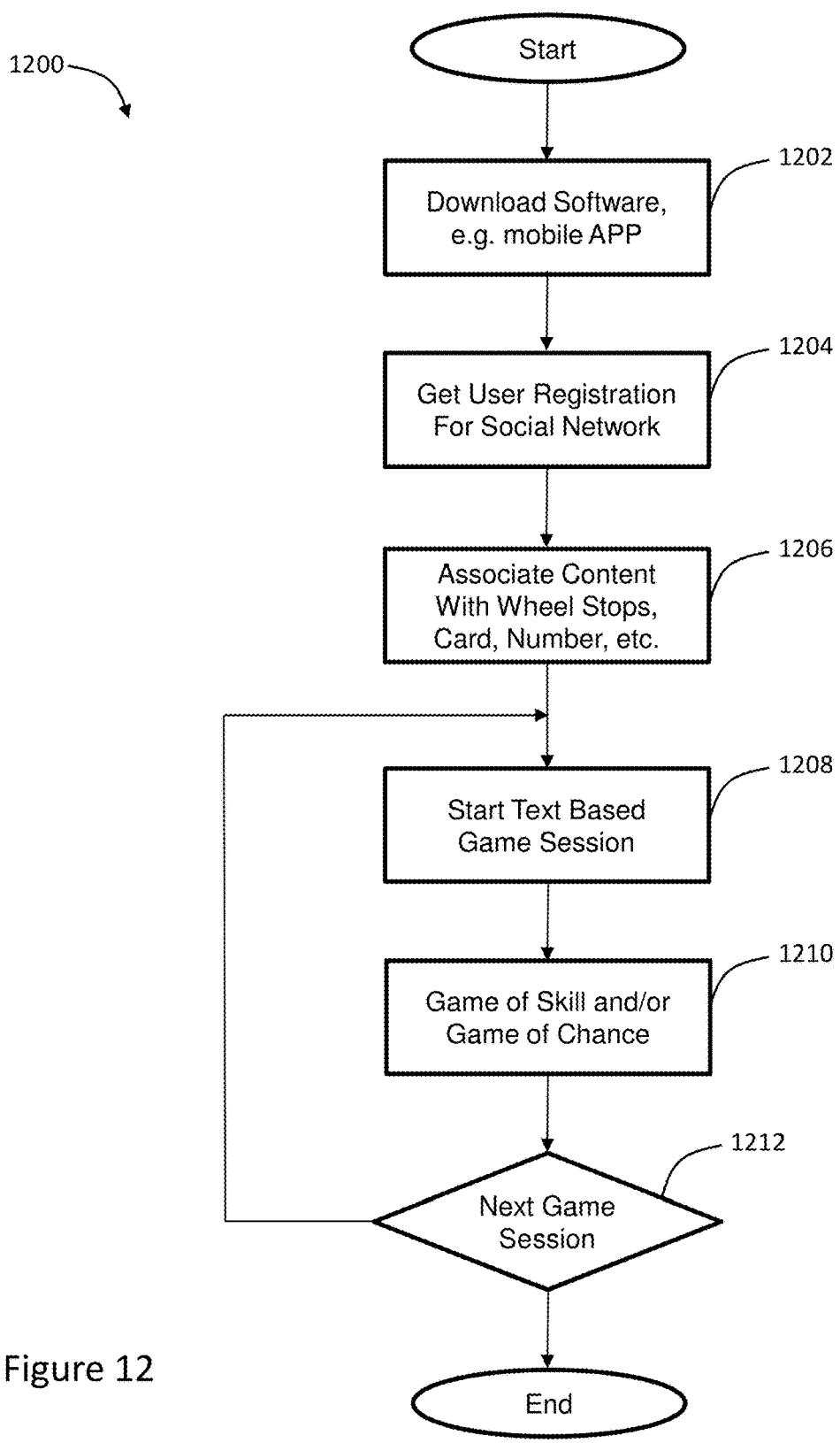

FIG. 12 shows an illustrative content item editor of the content administration interface.

Figure 13A:
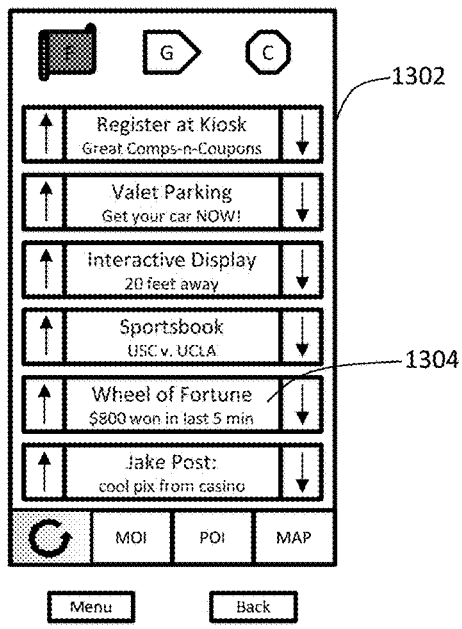

FIG. 13A shows an autonomous dynamic graphical user interface that is communicated to the wireless device.

Figure 13B:
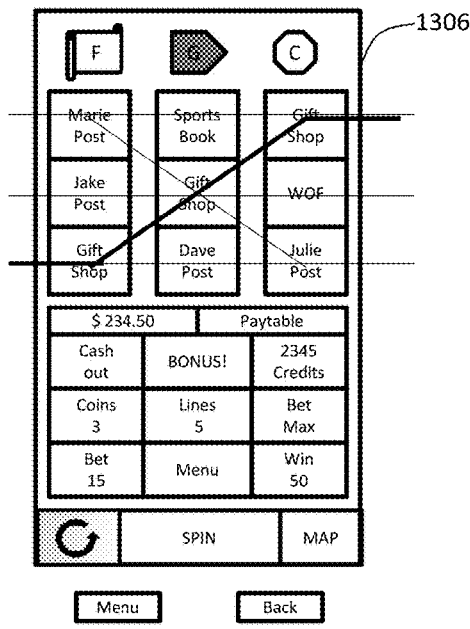

FIG. 13B shows a screen shot of an illustrative social slot machine game which is adjacent to the screenshot.

Figure 13C:
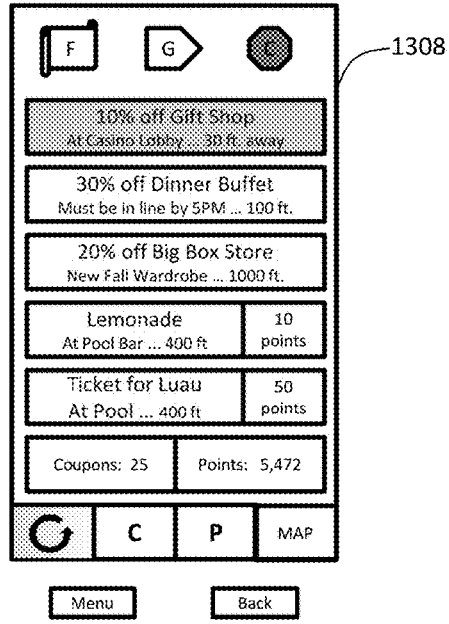

FIG. 13C shows an illustrative screen shot that is shown when a player is in a free play zone and is not able to wager.

Figure 13D:
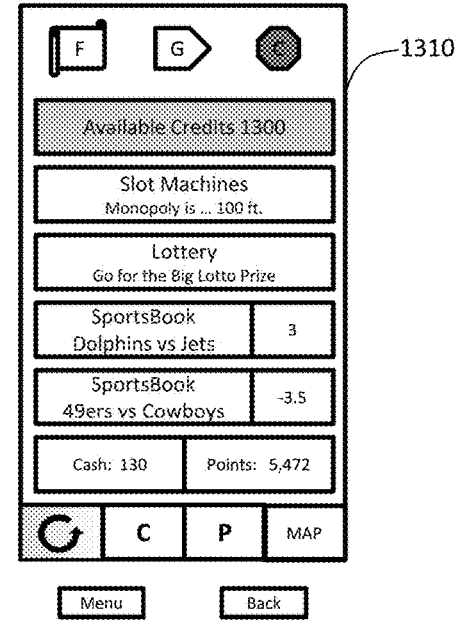

FIG. 13D shows a screenshot for real money wagering.

Figure 14A:
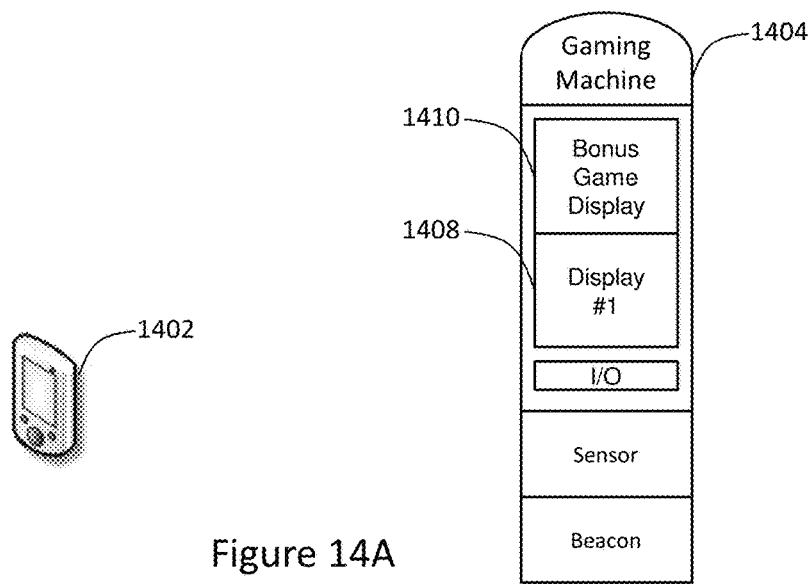

FIG. 14A shows a wireless device that has the controls for an illustrative gaming machine.

Figure 14B:
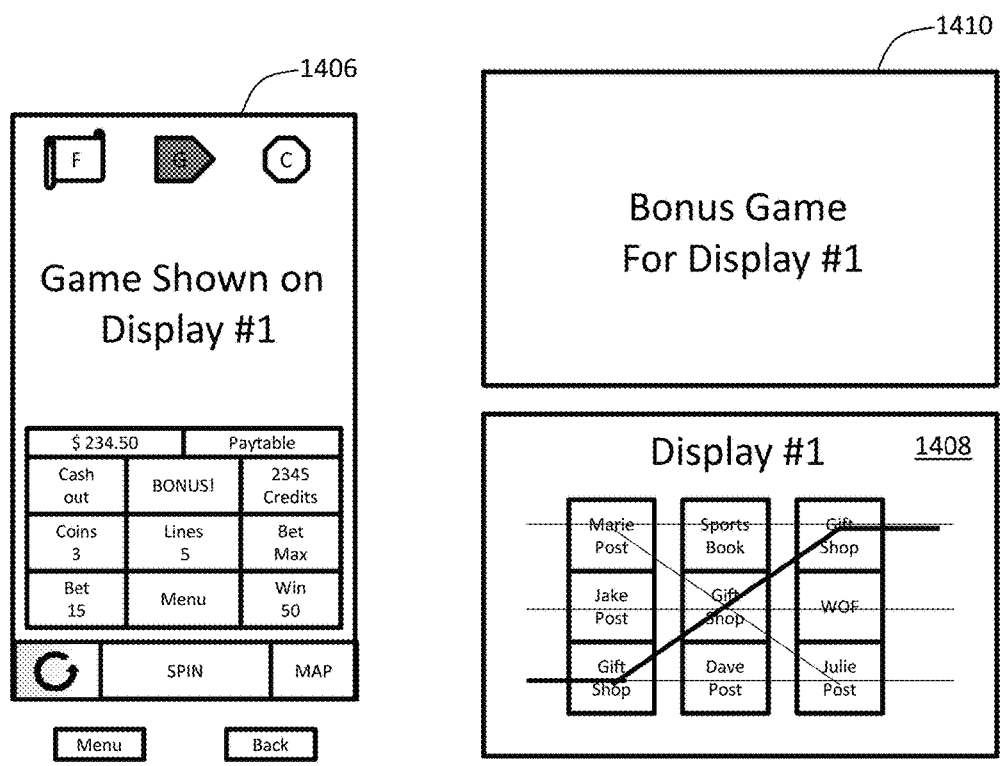

FIG. 14B shows a screenshot of slot machine controls and animated images presented on a slot machine display.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems described herein may vary as to configuration and as to details. Additionally, the methods may vary as to details, order of the actions, or other variations without departing from the illustrative method disclosed herein.

The context aware relevance engine (CARE) described herein has been adapted to integrated with one or more gaming systems, such as gaming modules that manage the "logic" of the game, an animation module that stores the animated images associated with a game, a player tracking system or slot management system that tracks game play, and other back end systems that can provide rich user profile information that can be used to filter content based on user profile and location.

The CARE middleware solution serves relevant content to a user and enhances his mobile application experience by "pushing" relevant content to the end user with little or no user input. In the illustrative embodiments presented herein, the content relevance engine creates a "context-aware" experience by combining user profile(s), outdoor positioning, indoor positioning, geofencing, and tracking user interactions with the context aware relevance engine.

Figure 1:
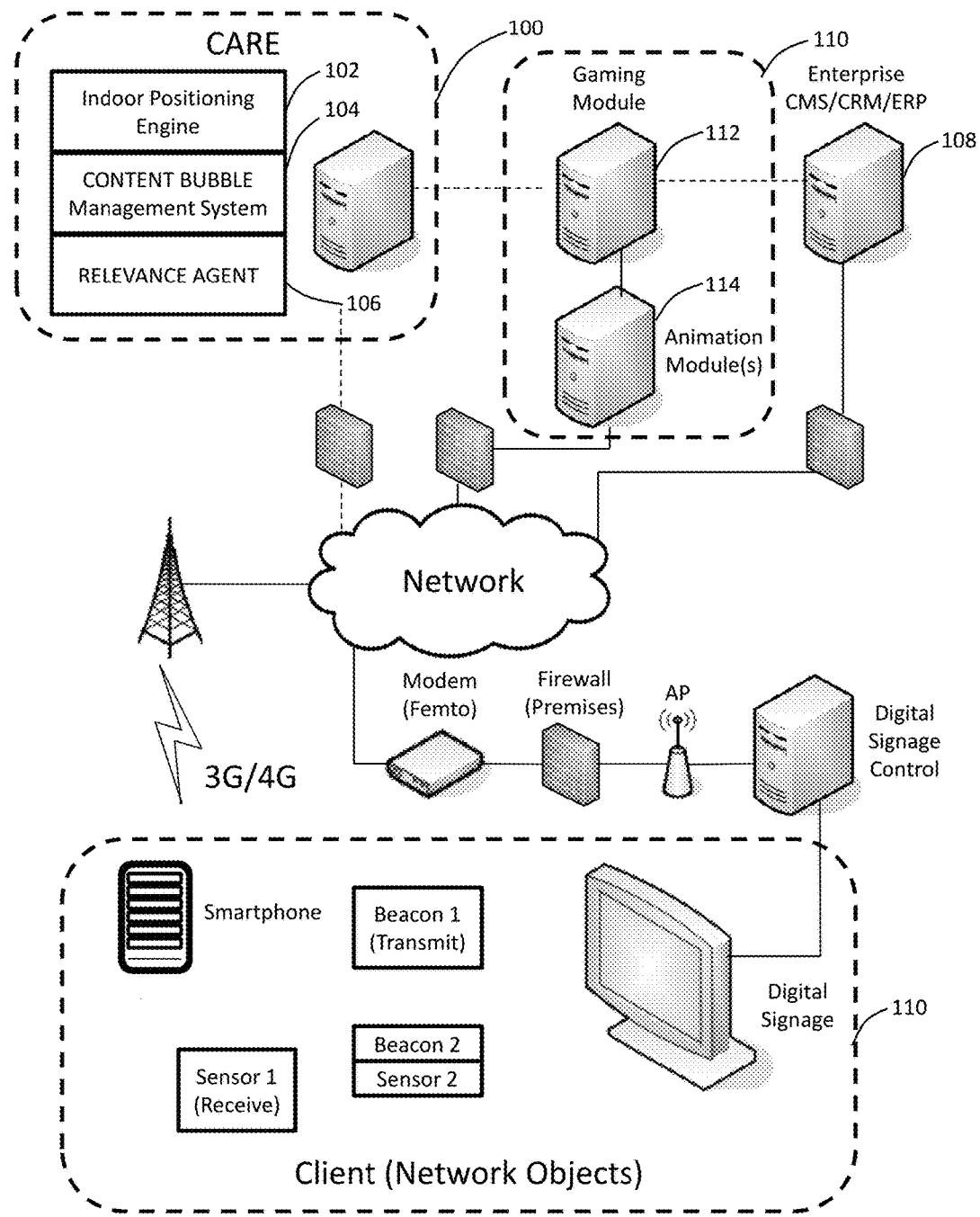
FIG. 1 shows a high level system drawing of the CARE platform interfacing with a gaming system.

Referring now to FIG. 1, there is shown a high level system drawing of the CARE platform 100 interfacing with a gaming system 110. The CARE platform 100 includes a positioning engine 102, a content management system 104, and a ranking module 106. The content management system associates content with a particular geofence, which is also referred to as a "content bubble." The ranking module 106 for the illustrative embodiment is referred to as "relevance agent."

In the illustrative embodiment, the CARE platform 100 serves real-time, relevant content to a mobile user via a mobile application based on indoor location and outdoor location, an opt-in user profile controlled by the user, content profiling including associating content with indoor geofences, and real-time feedback from users.

The CARE platform 100 is configured to interface with enterprise systems 108 and the illustrative gaming system 110. The enterprise systems 108 include accounting systems, enterprise resource planning systems, transactional systems, loyalty programs, customer relations management systems, billing systems, workers compensation systems, medical systems, electronic health record systems, hospital systems, security systems, calendaring systems, social networks, gaming systems, slot management system, player tracking system, other content management systems, and other such enterprise systems.

The gaming system 110 includes a gaming module 112 and an animation module 114. The gaming module 112 manages the "logic" of the game, an animation module 114 stores the animated images associated with a game. The gaming module 112 and animation module 114 are communicatively coupled to a player tracking system or slot management system that tracks game play.

The CARE platform 100 and gaming system 110 can exist as a cloud based system, a premises-based system, or a hybrid cloud system. When interfacing with the public Internet, the CARE platform and gaming system 110 resides behind either a cloud firewall or a premises-based firewall or any combination thereof.

The CARE platform 100 and gaming system 110 communicates with various client devices, which are also referred to more generally as network objects. A network object also includes passive and/or active electronic devices that can be identified by a networked client.

The CARE platform 100 in combination with the gaming system 110 enable a new level of highly interactive social gaming that can operate as a free play game or a real money game. Additionally, the illustrative features of the CARE platform include presenting indoor maps that include the indoor position of a particular user; associating local content with particular user profiles; integrating with an existing customer relations management (CRM) system or loyalty system behind the enterprise firewall; enabling mobile users to control their privacy setting from their smartphone client; building rich user profiles with a new set of attributes derived from real-time market surveys; supporting the building of indoor CONTENT BUBBLES (indoor geofences)— so that when a CONTENT BUBBLE is pierced, content links are pushed to the user's mobile application; allowing users within a particular CONTENT BUBBLE to generate their own content; allowing users to post within the CONTENT BUBBLE without having to share these posts with large social networks; ranking property-generated content links in real time based on indoor position, user profile, and feedback from similar users with the ranking module that is also referred to as a RELEVANCE AGENT; ranking user-generated content in real time based on indoor location, user profile and feedback from similar users with the RELEVANCE AGENT; pushing relevant content links to a dynamic portal page referred to as the Mobile Autonomous Dynamic Graphical User Interface (or MADGUI)—the MADGUI™ receives the automated rankings in real time and requires little or no user input; utilizing a link management platform that leverages existing content for seamless integration with the MADGUI™ advertising platform; combining property-driven content with user-generated content based purely on relevancy; controlling digital signage from the MADGUI™ smartphone client, so a user can walk up to a networked display and control the display from the MADGUI™ smartphone client; interfacing with digital signage systems, slot machines, set-top boxes and other such display systems; and generating real time business analytics based on conversions, ratings, indoor positioning, user profiles, and user feedback.

Figure 2:
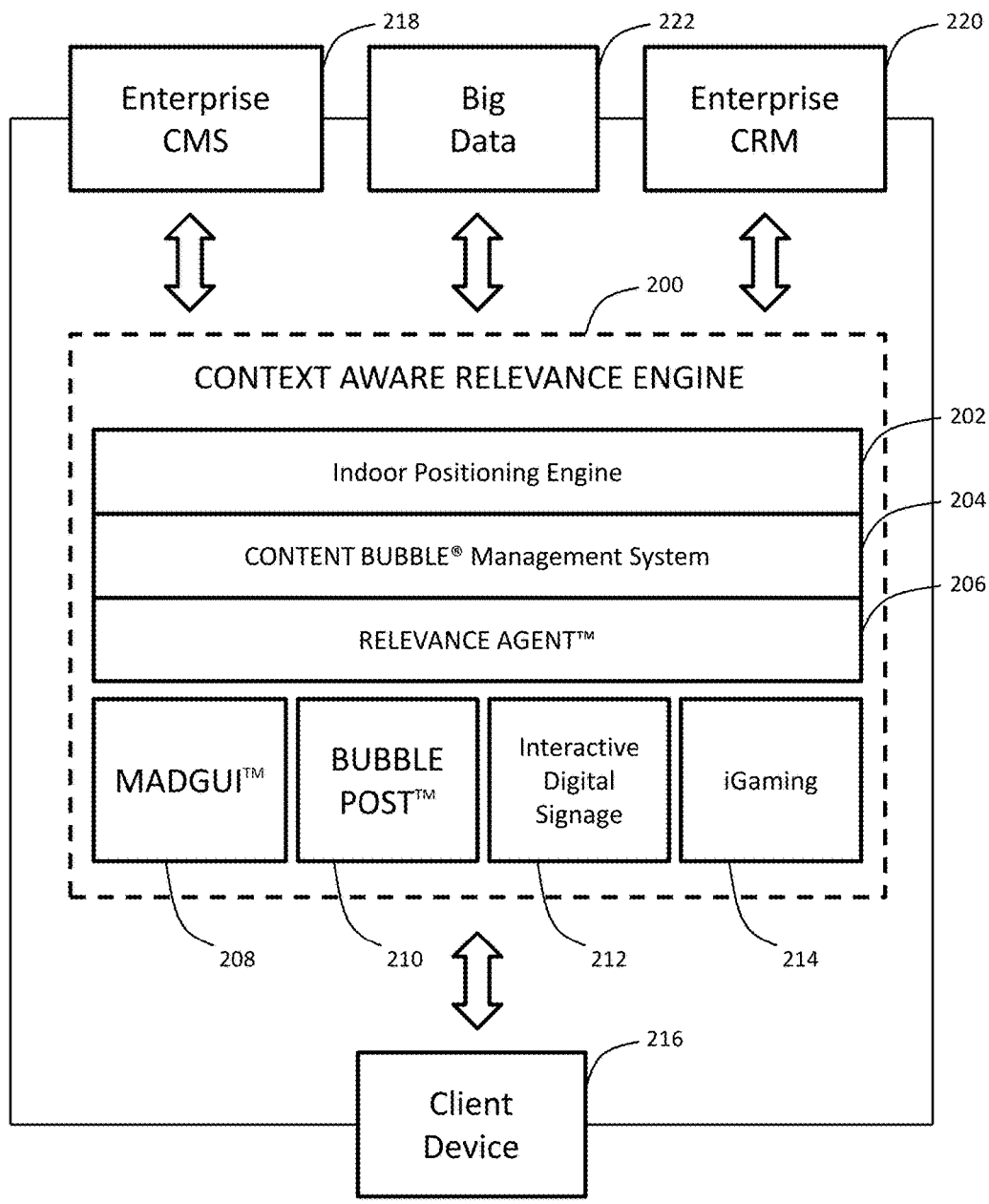
FIG. 2 shows an illustrative context aware relevance engine (CARE) platform.

Referring to FIG. 2, there is shown an illustrative context aware relevance engine (CARE) platform. The illustrative CARE platform 200 includes a variety of different modules. The first three modules include an indoor positioning engine 202, a CONTENT BUBBLE Management System 204, and ranking module 206 referred to as a RELEVANCE AGENT.

By way of example, the indoor positioning engine 202 relies on sensor inputs. The sensor inputs may come from the user's smartphone or from an independent sensor grid. After calculating a latitude, longitude and altitude, these coordinates are overlaid on a map. The indoor positioning engine enables content administrators to generate indoor geofences, which are also referred to as a CONTENT BUBBLES.

In the illustrative embodiment, the CONTENT BUBBLE Management System (CBMS) associates content with user profiles and the appropriate CONTENT BUBBLE 204. Thus, when an end user pierces a CONTENT BUBBLE, he or she is automatically served a group of content links that are associated with his or her user profile and location. CONTENT BUBBLES can overlap and some bubbles can be created for a portion of the property or for the entire property.

The third module is a ranking module 206. The illustrative ranking module is a "click-engine" that ranks content based on the content popularity to users having similar demographic profiles. This particular ranking module is referred to as a RELEVANCE AGENT. The RELEVANCE AGENT ranks and re-ranks content based on user profile, indoor location, click-throughs, recommendations, and other user-generated feedback. In general, the ranking module may operate using more sophisticated algorithms that such as used by search engines or social network.

The Mobile Autonomous Dynamic Graphical User Interface (MADGUI) 208 is a self-governing user interface that discovers and reacts to changes with little or no user input. The MADGUI is generated by integrating the indoor positioning engine, the CONTENT BUBBLE Management System, and the RELEVANCE AGENT to determine the most relevant content to push to each user. For example, if a 30-year-old female enters a CONTENT BUBBLE in a woman's clothing store, the MADGUI™ may push a 20% off coupon to entice her to make a purchase.

The MADGUI also lets users post content within a CONTENT BUBBLE and this feature is referred to as a BUBBLE POST 210. The BUBBLE POST 210 can be shared with the user's social network or other nearby users. The BUBBLE POST supports a proximity-based social network. Depending on security concerns, the BUBBLE POST can also be treated as a highly confidential messaging solution that restricts the viewing of the BUBBLE POST by allowing only specific users within a specific CONTENT BUBBLE to view and interact with the BUBBLE POST.

Another product supported by the CARE platform is interactive digital signage 212 that does not loop the same content over and over. The CARE platform satisfies privacy concerns by enabling users to opt-in to behavioral advertising. Since the CARE platform knows the location of the MADGUI client and the location of the digital signage, highly targeted and relevant advertisements can be served up to the digital signage with appropriate user opt-in. Additionally, a unique set of links can be served up to the smartphone so the end user can control what is being viewed on the illustrative HD display from the user's smartphone.

Yet another product supported by the CARE platform includes a gaming module 214. Indoor location information may be integrated into a game, as well as relevant advertisements, and relevant user posts can be communicated to a gaming module. The feedback from the gaming module may be used to improve the content communicated to the gaming module. The game module may include a game of chance, a game of skill, or a combination thereof. By way of example and not of limitation, an internet based gaming module is described in issued U.S. Pat. No. 8,403,755, which is hereby incorporated by reference, that may also be integrated with the CARE platform. The CARE platform operates as a player tracking module that "tracks" more than just coin-in and coin-out. The CARE platform can also be used to track the player's interest and preferences so a personalized and relevant end user experience can be presented to each player.

The output from the CARE platform is communicated to client devices 216 that can be a wired client or a wireless client. In one embodiment, responsive inputs received by the client device 216 may be communicated to the Enterprise CMS 218 and the Enterprise CRM 220. The CMS 218 and the CRM 220 may then proceed to analyze the responsive inputs and modify content, trigger events, user attributes, user profiles, geofences, loyalty rewards, server states and other such operating parameters that are stored on the CARE platform. Additionally, the Enterprise CMS 218 and CRM 220 may also be operatively coupled to a big data module 222 that analyzes a large collection of data sets.

The responsive inputs received client device may also be communicated to the CARE platform and the ranking module can use the responsive inputs to re-rank content based on end user feedback.

Figure 3:
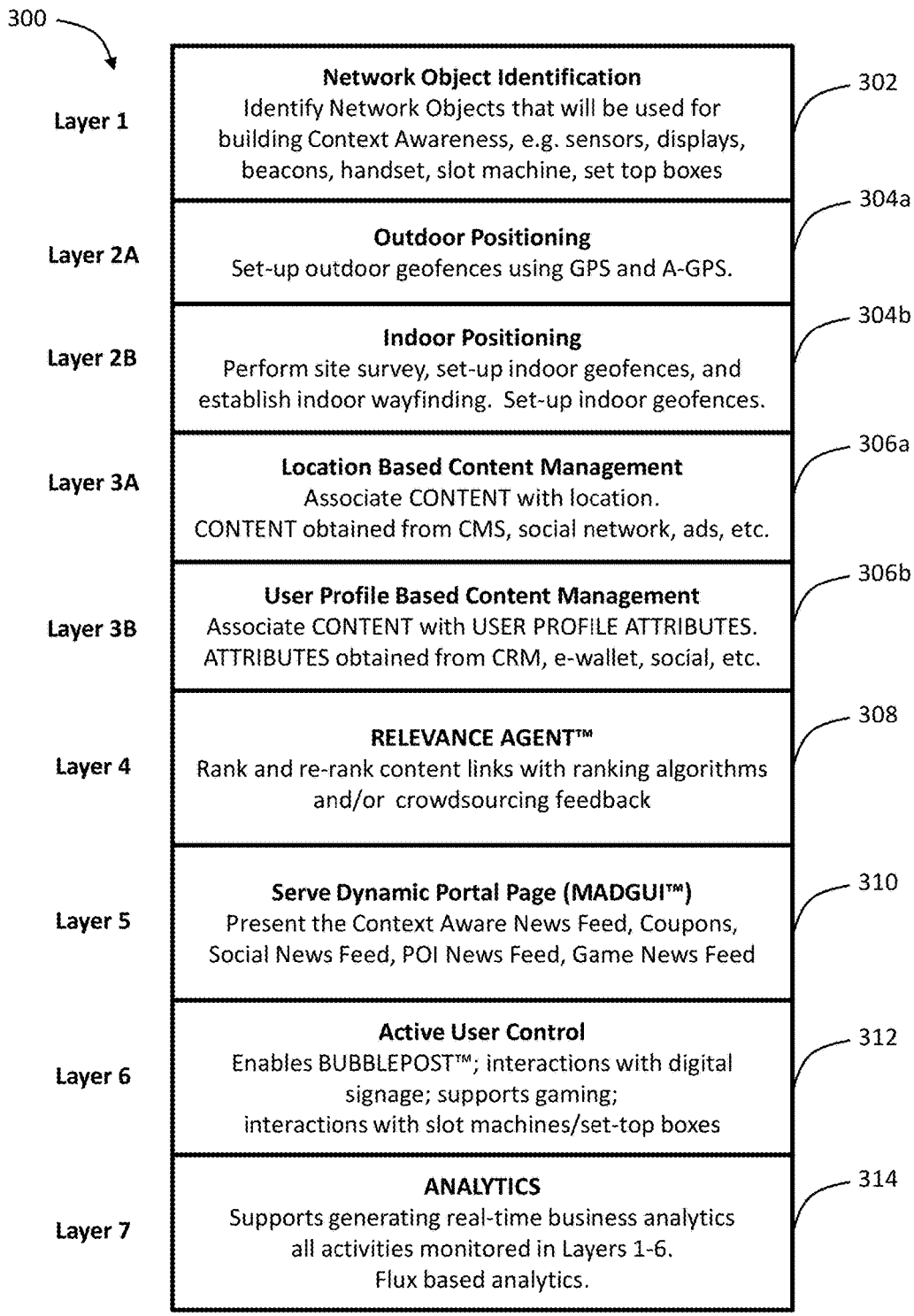
FIG. 3 shows a more general representation of the contextual layers of the CARE platform.

Referring to FIG. 3, there is shown a more general representation of the contextual layers of the CARE platform. The CARE platform operates either in a public/private cloud or behind the enterprise firewall. The MADGUI client UI is autonomous or self-governing so the links change with little or no user input. The CARE platform may also be interpreted as a series of contextual layers that are housed within an integrated platform.

The first contextual layer 302 identifies the network objects that will be used to build contextual awareness. A network object is a client device that has a particular identity, e.g. MAC ID, and can be identified remotely. Generally, the network object is capable of being communicatively coupled to a network such as a WAN, e.g. the Internet. Sometimes the network object is a "beacon" that communicates a beacon identifier, which can then communicated by another network object to a server capable of authenticating the network object. By way of example and not of limitation, network objects include sensors, beacons, displays, wireless devices that access a network, gaming machines, gaming consoles, slot machines, set-top boxes, and other such devices that are capable of accessing a network or devices capable of transmitting signals to networkable devices.

The second contextual layer 304 relates to positioning and is divided into outdoor positioning 304a, i.e. Layer 2A, and indoor positioning 304b, i.e. Layer 2B. The outdoor positioning 304a (Layer 2A) relies on GPS and A-GPS and generally occurs on the client-side wireless device, e.g. a smartphone. Generally, the outdoor positioning includes a navigation module to assist in car navigation.

The indoor positioning 304b includes an indoor positioning engine that is used to determine indoor location of a wireless device. The indoor positioning engine may include indoor wayfinding. In the illustrative embodiment, the indoor positioning engine includes a sensor grid that is used to build reference points similar to RF fingerprints. RF fingerprints captured by a wireless device and compared with the reference points to determine indoor location. RF fingerprinting may be performed with Wi-Fi beacon signals and Bluetooth beacon signs. The result is a latitude, longitude and altitude that can be placed on a property map. The sensor grid, which is one of the network objects, is extensible and supports adding additional sensors (such as IR sensors) or additional beacons (such as weak WiFi or Bluetooth beacons) to improve indoor accuracy.

The second contextual layer 304 also supports the generation of geofences. The geofences may be indoor geofences or outdoor geofences. The geofences or CONTENT BUBBLES may large or small and may be defined by either the end user or the enterprise customer.

The third contextual layer 306 applies a contextual overlay to existing content. In Layer 3A 306a "context" is created by associating location with "content" by either geocoding the content or associating the content with an indoor or outdoor geofence. The content can be retrieved by using a web crawler or by accessing a content management system. The content may be collected from social networks. The process of geocoding the content or associating the content with a geofence can be performed manually or using an automated algorithmic process.

For example, if the content links are generated for the corresponding content, only the content links need to be geocoded—and the wireless device can determine a perimeter within which to grab geocoded content links and to present the geocoded content links according to a ranking module that also resides on the wireless device.

In Layer 3B 306b, the context is created by taking existing content and associating the existing content with a user profile that includes a plurality of user attributes. The user attributes may be obtained from a social website or application, in which the end users elect to share their user attributes. The user attributes may also be obtained from a loyalty program, a customer relations management (CRM) system, an e-wallet, an end user's transactional history, or an end-users own preferences that are integrated into a particular software application.

When Layers 2 and 3 are combined, the result is an automated "check-in" process, in which an end-user can access content directly.

In the illustrative embodiment presented herein, context is created by combining indoor geofences (CONTENT BUBBLE)) with content at Layer 3A, and associating the content with user attributes corresponding to a user profile in Layer 3B. A descriptive link can then be served up to the user in an automated manner that takes the user to the desired content.

The next contextual layer 308 referred to as Layer 4 includes a ranking module, which is also referred to as a RELEVANCE AGENT, that ranks content links is based on end-user feedback or feedback from the end user community. The content links may be ranked according to user profile, indoor location, click-through rate, recommendation (like, not like), and user-generated feedback. The RELEVANCE AGENT may apply search or ranking algorithms. The RELEVANCE AGENT may also rely on crowd sourcing similar user profiles and positioning to determine link popularity. As described in the further detail below, the RELEVANCE AGENT can generate a unique relevance weight for each content link or content item. Generally, the relevance weight changes as a function of time for a particular set of user attributes.

The fifth contextual layer 310 serves a dynamic portal page, which is also referred to as the MADGUI or a context aware news feed. This Layer 5 is associated with pushing relevant content links to the mobile user with little or no user input. In the illustrative embodiment, the MADGUI is self-governing and changes based on various parameters such as user profile, location of the wireless device, and real-time content rankings from the module. The MADGUI principally pushes relevant content links to the end user and may also include a search string to support "pull" based mobile search.

The sixth contextual layer 312 refers to the end user being in an "active" mode. In Layer 5, the end-user is in a more "passive" mode and the content links are pushed to the end user. In Layer 6, the end user is actively interacting with their wireless device. Generally, the active mode includes having the end user type text into the wireless device, speak into the wireless device, or take a picture with the wireless device. This active user state is referred to as a "local interaction." In the illustrative embodiment presented herein, the local interaction includes having an end user elect to post content.

By way of example and not of limitation, the end user may decide to "post" content within a CONTENT BUBBLE. In this embodiment, active user control resides on top of the previous contextual layers. When the user shifts to active user control the user may be selecting to give feedback and rate content that has been sent to them. Thus, the active user post can be used to improve one or more of the previous contextual elements.

Another illustrative example of active user control includes enabling a user to interact with digital signage from his wireless device as described in further detail below.

The seventh contextual layer 314 is directed to analytics. Each contextual layer has a corresponding analytic that can be combined with one or more layers. For example, conversions based on indoor location can now be monitored. The number of people and user profiles in a particular geofence can now be monitored remotely without the need for cameras. The popularity of content can be monitored with relevance weighting plotted as a function of time. Active user control can also be monitored based on user profile, location, and context.

Referring to FIG. 4A there is shown an Application Programming Interface (API) specifies how software components should interact with one another. For the Products identified above, the following illustrative APIs were developed. By way of example and not of limitation, the illustrative API's operate on an Android wireless device and employs the Windows Communication Foundation (WCF) using the architectural system known as the Representational State Transfer (REST).

The illustrative APIs presented herein operate by "streaming" information from at least one network appliance, e.g. a server. Alternatively, the APIs may be set-up to integrate with locally stored content on the wireless device. Furthermore, there may be a combination of operations that occur locally, e.g. on at least one wireless device, and on the network appliance, e.g. at least one cloud application.

Generally, a "network appliance" or "networked client device" refers to any device that is independent of the wireless device(s) and that communicates with the network appliance, such as a web server, server, cloud platform, and other such appliance that accesses a local area network (LAN) or wide area network such as the Internet. The illustrative wireless devices may include a Bluetooth watch, such as the Samsung Galaxy Gear, in communication with a wireless device, such as the Samsung Note III, which is communicatively coupled to a LAN and the Internet.

By way of example and not of limitation, all methods use POST request methods. All input/parameters and response data in the illustrative embodiment use JSON only. All parameters are mandatory unless otherwise specified. Note, that the illustrative embodiment uses Wi-Fi for indoor positioning, however, Bluetooth and other such beacons can be used for indoor positioning.

The UserRegistrationCustomer API call 402 retrieves customer registration that may have been obtained during the signup process or from accessing a loyalty program, a player tracking solution or a slot management system. The user registration may include age, sex, zip code, etc. The UserRegistrationCustomer API call 402 allows new MADGUI users to register a new profile. The DeviceID is treated as unique, so ProfileID and DeviceID are both unique and have a one-to-one relationship in the customer handset application. If new values are passed for an existing DeviceID, the profile is updated and the existing ProfileID is passed back in the response. By way of example and not of limitation, the API accepts the input parameters DeviceID, Gender, AgeGroup, ZipCode, and optionally DisplayName (used for user content posts). The illustrative response returns the associated ProfileID for the requesting device and/or any exception messages encountered during within the function. The returned ProfileID is stored on the illustrative wireless handset. The ProfileID is later passed with many of the handset API requests including GetContentLinks.

The UploadCIBeaconReadings API call 404 uploads Wi-Fi and/or Bluetooth beacon readings to associate a position with a content interaction event.

The GetContentBubbleMaps API call 406 gets clickable content bubble map if on site or list of maps nearby. This API allows user to retrieve a map displaying clickable content bubbles overlaid on an indoor/property map image. This API further allows users to explore the content for various physical spaces without requiring them to physically move to the desired bubble/space. Additionally, this API provides a working interface to provide contextually relevant content by location without Wi-Fi or other indoor positioning methods, such as Bluetooth, which can also be used for indoor positioning.

The YouAreHere API call 408 retrieves a map with user's location for display on handset. This API allows users to retrieve a map displaying their current location. The API accepts ProfileID to identify the user and BeaconTable to provide location. The response passes back the URL for the local map image and the user's location in pixels on the map image. The Position Radius is also passed back to demonstrate positioning confidence and precision. The ExceptionMessage passes back any exceptions caught within the function.

The GetContentLinks API call 410 retrieves content links by profileID and location for the illustrative wireless handset display. This allows the user to get new content links based on profileID and current location. This API is currently called repeatedly on the handset every two to fifteen seconds. The GetContentLinks API call 410 accepts input parameters ProfileID and BeaconTable. The illustrative links are ranked by relevance and returned using the profile group inclusions and the beacon table for positioning. The Beacon Table is an array of WiFi and/or BlueTooth signal readings that may include MAC address and RSSI and this is used to determine position. More detail on the ContentLink object can be provided upon request. An ExceptionMessage string object is also included in the response. This object returns any exceptions encountered during this function.

The GetContentLinksByParent API call 412 retrieves content links by Parent Link ID for handset display (click through). This API allows users to click through 'parent' content links to the sub links associated with the link clicked. The API accepts input parameters ProfileID and ParentCIDs (content link identifier) and returns a new array of content links for display on the handset. ParentCIDs is an integer array allowing multiple content ids to be passed for preloading on the handset. ParentID is part of the ContentLink object so preloaded links could be easily filtered on the handset on the click event.

The GetContentLinksByBubble API call 414 retrieves content links by content bubble id for handset display (click through). This API is used when a map is presented to the user and there are bubbles presented on the map. The user can touch a bubble on a map and retrieve the content links associated with the bubble displayed on the map.

The ContentFeedback API call 416 retrieves user ratings such as a thumbs up/thumbs down, a star rating or other such rating. This API call allows users to provide content feedback. The ContentFeedback API call 416 accepts input parameters ProfileID, ContentID and PositiveFeedback is stored by ContentID with ProfileID and the date/time. The relevance values are then adjusted by attribute groups based on the profile attribute group memberships. Positive is a bit value and can be positive or negative. The relevance values are adjusted positively or negatively based on this value. Feedback is also part of the ContentLink object and previous feedback is passed back in the GetContentLinks responses. The illustrative wireless handset displays previous feedback on the links. By way of example and not of limitation, stored feedback can be reversed, but the same feedback cannot be posted for a piece of content more than twice.

The UserContentPost API call 418 allows users to post messages by profileid and location. Allows users to post content from the handset. The API accepts the input parameters Message, BubbleLevel, BeaconTable, and either DeviceID or ProfileID. The message is of course the content to be posted. The BubbleLevel allows for integer values to specify the range of the localized content, with 0 for 'content bubble' and 1 for 'property bubble'. BeaconTable is used for location, and either DeviceID or ProfileID must be passed to identify the user. If there is no DisplayName associated with the posting user, an exception message is passed back and the user content is not posted. Any other exceptions encountered within the function will also be passed back in the Exception Message.

The ShowMediaOnDisplay API call 420 allows users to stream or load media on the networked displays. The Show- MediaOnDisplay API accepts the input parameters ProfileID, IP address for display, URL, and MediaURI. The ProfileID is used for logging in. The illustrative MediaURI is the path for the data file, e.g. content, to be displayed. The path can be a public URI or just the name of a local file in the NexRF display media folder. The local folders can be synchronized from a centralized media server. Alternatively, the data file may be streamed as an encrypted file, e.g. encrypted game content, and a URL for the game session is associated with the content that is presented on the Display. When this API is called, the media path is passed to the nearest display and the display will display the local content or streamed content. Content links of the display media type should only be set up within bubbles in which a display exists. Validation is supported with the Content Management System.

The StartGameSession API call 422 allows a player to initiate a server based game session, e.g. a slot machine game. This API allows a player to initiate a game session from their illustrative wireless device. Thus, the controls for an illustrative slot machine such as the "start" game session button is disposed on the wireless handset. Once the API has been received on the server side, a game session is begun on the server side. By way of example and not of limitation, the results of the game session are then streamed to the appropriate display according to the ShowMediaOnDisplay API call 420.

The GetGameDecryptionKeys API call 424 allows the player to obtain the decryption keys for encrypted content. The player may need to obtain a decryption key to decrypt the encrypted content that was streamed to the nearby display. The decryption key may only be valid for a certain period of time or may only be valid in a particular location or a combination of both parameters.

Referring to FIG. 4B there is shown an illustrative system 430 that would support the multi-channel communication of data files for an illustrative social slot machine game presented herein. More specifically, the screen shots for the illustrative social slot machine game are presented in FIGS. 13-14. By way of example and not of limitation, the illustrative game may operate as a multiplayer game, in which awards are provided to players in a manner similar to a basic slot machine, a progressive linked slot machine, a social slot machine tournament, or a slot machine tournament game with a lottery backend.

The illustrative gaming system 430 may also integrate with streaming gaming solutions that generates random outcomes on the server side, associates an image ID with the random outcome on the server side, and transmits the animated images from the server side to a client device. By way of example and not of limitation, streaming gaming technologies as described in U.S. Pat. No. 8,506,406, U.S. Pat. No. 8,506,407, U.S. Pat. No. 8,523,679, and U.S. Pat. No. 8,403,755, and which are hereby incorporated by reference, may be utilized.

In the illustrative system 430, a variety of different wireless devices 432 are accessing an illustrative local network appliance 434 that manages and streams the illustrative "social" game. The local network appliance 434 may be "local" to the property and may reside within a casino property or be associated with a virtual machine managed or controlled by a casino property or a slot manufacturing company. Although the illustrative game is a multiplayer slot machine, any other multiplayer game may also be employed.

The game output from the local network appliance 434, e.g. local server, may be streamed to a wireless handset 432a, a wired gaming machine 436, a wireless laptop 432b, a wired digital signage screen 438, to a phablet 432c, e.g. Samsung Note III, and a wearable computing device 432d such as a Samsung Galaxy Gear.

The social slot game or social game may operate synchronously or asynchronously. Asynchronous game play is a popular phrase for describing various forms of online games that connect players but don't require simultaneous play. The more casual definition of synchronous game play means 'playing at the same time'.

Referring to FIG. 4C there is shown an illustrative multi-channel system 440 that communicates an encrypted data file to a networked client device and a decryption key to a wireless device.

The multi-channel system 440 for communicating secure content to a networked client device and a wireless device includes a storage network cloud component and a registration cloud component that are for illustrative purposes embodied in the CARE platform 442.

An encryption network cloud component 443 is also embodied in the CARE platform 442 and includes key generation module 444, decryption key module 446 and encrypted content module 448.

A first communication path 450 between the encryption network cloud component and the networked client device reflects the path for the encrypted content 448. A second network communication path 452 between the encryption network cloud component and the wireless device reflects the path for the decryption key 446. A third network communication path 454 between the wireless device 456 and the networked client device 458 enabled the encrypted content that is presented on the display 460 to be decrypted by the decryption key that is communicated to the wireless device.

The CARE platform 440 includes a storage network cloud component stores a plurality of data files in a storage network cloud component and a registration cloud component registers the networked client device(s). The networked client device 458 is disposed in a location that includes at least one beacon 462 (embodied as the CBUBL) that generates a beacon identifier so that the beacon identifier is included in the registration of the networked client device.

The encryption network cloud component 443 generates an encrypted data file from a data file. Additionally, the encryption network cloud component 443 is communicatively coupled to the storage network cloud component, which may be associated with the CARE platform 442 or which may be a separate network cloud module that the CARE platform 442 links to.

In one illustrative embodiment, the third network communication path 454 between the wireless device 456 and the networked client device 458 communicates the decryption key from the wireless device to the networked client device, when the wireless device is within proximity of the networked client device. By way of example and not of limitation, the proximity of the wireless device to the networked client device is determined by having the wireless device detect a beacon identifier associated with the networked client device, e.g. the CBUBL 462. The encrypted data file on the networked client device is decrypted with the decryption key transmitted by the wireless device.

In one embodiment, a decryption key acknowledgement (not shown) is generated when the decryption key is received by the client 460 or 458. The decryption key acknowledgement is communicated from the networked client device 460 or 458 to the encryption network cloud component, which records that the decryption key that was communicated to the wireless device was received by the networked client device.

In another illustrative embodiment, the first communication path 450 includes a local area network that supports the networked client device being communicatively coupled to a firewall 464 that is communicatively coupled to each network cloud component along a wide area network. The second communication path 452 includes a wireless carrier network operating a high bandwidth wireless protocol supports communications between the wireless device and each networked cloud component. The third communication path 454 includes a localized wireless communication protocol that supports communications between the wireless device and the networked client device.

Referring to FIG. 4D there is shown an illustrative multichannel system 465 that communicates an encrypted data file to a wireless device and a decryption key to a networked client device.

A first communication path 466 between the encryption network cloud component and the networked client device reflects the path for the encrypted content 448. A second network communication path 467 between the encryption network cloud component and the wireless device reflects the path for the decryption key 446. A third network communication path 468 between the wireless device 456 and the networked client device 458 enabled the encrypted content that is presented on the wireless device 456 to be decrypted by the decryption key that is communicated to the networked device 458. Thus, the wireless device 456 must be in proximity to the networked device to receive the decryption key that allows the decrypts the content on the wireless device 456.

By way of example and not of limitation, the proximity of the wireless device to the networked client device is determined by having the wireless device detect a beacon identifier associated with the networked client device, e.g. the CBUBL 462. The encrypted data file on the wireless device is decrypted with the decryption key transmitted by the networked client device.

Referring to FIG. 4E, there is shown an illustrative system 480 for preventing spoofing and communicating encrypted gaming content. In this illustrative embodiment, the CBUBL 482 is operatively coupled to a local network device 484 via an illustrative USB 2.0 connection 485. The networked device 484 may be any networkable device having a CPU 486 and Memory 487 that is capable of running an OS and/or a browser. Alternatively, the OS and/or browser may also run on the CBUBL and so the networked device is not required to have a CPU and memory.

In one illustrative embodiment, the CBUBL 482 operates passively in a "listen" mode. In this listen mode "1," the CBUBL 482 is configured to detect mobile devices emitting a Bluetooth (BT) signal. The CBUBL 482 distinguishes between known BT (or Wi-Fi) signals and unknown BT (or Wi-Fi) signals. Although reference is made to BT below, the type of radio may be substituted to Wi-Fi or any other such radio that can be used for communications.

The known BT signals are continuously identified by the CBUBL 482 at 2, in which a list of known BT devices are constantly being identified and stored on the CBUBL, the networked device or the CARE platform 488. Additionally, the list of known BT devices may be communicated to a CARE VM and stored on the CARE database associated with the CARE platform 488. Unknown BT device that are identified at 2, and their respective IDs are communicated to the illustrative CARE remote server, VM, database, container, or any combination thereof. In the illustrative "simplex" embodiment, the back channel communications 3 and 4 of the CBUBL 482 and the remote server or VM(s) are secured by a firewall 490.

The illustrative server or VM is operatively coupled to a database and the unknown BT mobile ID is looked up in the database. The database may be part of the CARE platform 488, part of the gaming module 491 or its own separate "anti-spoofing" module 492. If the BT mobile ID is not in the database, then no further action is taken other than to track the location of the unknown mobile device.

If the BT mobile ID is identified within the database then an acknowledgement is communicated at 6. The illustrative CARE VM includes a key generation module. The key may be generated with symmetric key algorithms, public-key algorithms, or any combination thereof and for simplicity reference is just made to "key generation." The purpose of key generation to is to encrypt and decrypt a data file. Multiple keys may be generated at regular or random intervals for each data file.

Encryption is the process of encoding messages or information in such a way that hackers cannot read the messages, but that authorized parties can access the data file. In an encryption scheme the message or information, referred to as "Plaintext," is encrypted using an encryption algorithm, turning it into an unreadable "Ciphertext"." This is usually done with the use of a "Key (cryptography)", which specifies how the message is to be encoded. Any adversary that can see the ciphertext should not be able to determine anything about the original message. An authorized party is able to decode the ciphertext using a decryption algorithm that usually requires a Key (cryptography)", which hackers do not have access to. Generally, an encryption scheme uses a key-generation algorithm to randomly produce keys.

There are two basic types of encryption schemes: "Symmetric-key algorithm" and asymmetric-key encryption which includes "Public-key encryption". In symmetric-key schemes, the encryption and decryption keys are the same. Thus, communicating parties must agree on a secret key before they wish to communicate. In public-key schemes, the encryption key is published for anyone to use and encrypt messages. However, only the receiving party has access to the private decryption key and is capable of reading the encrypted messages. Public-key encryption is a relatively recent concept. Historically, all electronic encryption schemes have been symmetric-key (also called private-key) schemes.

In the illustrative embodiment, a notification using the wireless 3G/4G network to the illustrative wireless device 481, e.g. smartphone, at 7. The user receives the notification, which allows the user to open the mobile application directly through the notification. when the user's mobile app is opened, an encrypted data file may be received by the mobile device via path 7. The mobile app proceeds to communicate the encrypted communication to the CBUBL at 8. Meanwhile a decryption key is communicated from the CARE VM at 9 to the CBUBL. The CBUBL decryption key is used to decrypt the communications from the mobile device. As a result, the mobile device is authenticated as a valid device that can communicate with the CBUBL and the networked device. The decryption of the encrypted data file may occur at the CBUBL, the networked device, the mobile device, or any combination thereof.

In another embodiment, a user biometric is stored in the database and associated with the mobile user. This user biometric and the decryption key are securely communicated to the CBUBL. The decryption key is used to decrypt the encrypted data file received by the mobile device, and the biometric is used to authenticate the mobile user. Note, it is assumed that the mobile device can read a user biometric and communicate this user biometric in combination with the encrypted data file to the CBUBL.

The decryption process may occur at the CBUBL or the mobile device depending on the particular mobile application, the resource constraints of the CBUBL, and the resource constraints of the mobile device. For example, if the decryption key is communicated to the mobile device, then the mobile device decrypts the encrypted file that is communicated to the networked device, which may be a display or slot machine. If the decrypted file is a mobile personalized news feed, then the personalized news feed (MADGUI) allows the user communicate with the CARE VM at 11.

The illustrative communications 11 between the wireless device 481 and the CARE platform 488 are bidirectional. Additionally, an instruction served to the wireless device 481 via the mobile personalized news feed may be received by the CARE VM and this instruction may be communicated directly to the networked device at 12, In one embodiment, the CBUBL may perform other operations including monitoring the communications generated by the mobile device using including a fast, hardware-type firewall that performs a stateful multilayer inspection, in which the firewall provides packet filtering using a secure protocol such as IPSec. This protocol provides encryption of the data at the packet level, as well as at the source address level. Without access to the encryption keys, a potential intruder would have difficulty penetrating the firewall. Additionally, it would be preferable to provide a circuit level gateway and an application level gateway. The circuit level gateway works on the session layer of the OSI model or the TOP layer of the TCP/IP model and monitors TOP handshaking between packets to determine whether a requested session is legitimate. The application level gateway filters data packets at the application layer of the OSI model. A stateful multilayer inspection firewall offers a high level of security, good performance and transparency.

In a "duplex" embodiment, a second encryption process or duplex encryption process may be implemented. In a duplex encryption process, a data file is divided into two or more data files, a first set of encrypted data files is received by the CBUBL, and the decryption key is received by the mobile device. A second set of encrypted data files is received by the mobile device and the decryption key is received by the CBUBL. Both sets files are decrypted by the predetermined client-side device. The decrypted first set and second set are then combined to generate the original data file. This duplex embodiment ensures that both communication channels (cloud to mobile and cloud to CBUBL) have not been compromised.

The illustrative local networked device includes, but is not limited to, a display, kiosk, gaming console, set top box, PC, gaming machine, class II slot machine, class III slot machine, keno machine, lottery, table game (poker, pai gow, craps, blackjack, etc.), smartphone, tablet, phablet, public Wi-Fi, private Wi-Fi, Point-of-Sale device or system, Enterprise Resource Management system, Inventory Management System, Customer Relations Management system, Content Management System, digital cameras, biometric sensors, security systems, and other such systems that include a microprocessor and memory that are located locally and are networkable.

Fundamentally, the CARE and CBUBL can decouple a traditional computing device with local I/O and migrate the I/O to the UX on the mobile device with the typical traditional local computing processes transferred to the cloud.

For example, a typical kiosk includes a keyboard or touch interface to control the kiosk screen. With the combined CARE and CBUBL as described in FIGS. 4A-4E, the kiosk keyboard or touchscreen is not needed and these UI controls can reside on the user's mobile app. Additionally, the majority of functions of the kiosk such as a database, search and ordering functionality may also be performed on the cloud. The traditional kiosk cost is reduced to be being a network display with some content stored locally, which is substantially cheaper than a typical kiosk.

In another illustrative example, such as a slot machine, the input controls are communicated to a user's mobile phone—these controls may be part of the personalized news feed or are part of a smartphone application. The RNG, paytable, and animated images may reside in the gaming module 490 as described in streaming gaming patents U.S. Pat. No. 8,506,406, U.S. Pat. No. 8,506,407, U.S. Pat. No. 8,747,229, U.S. Pat. No. 8,523,679 and U.S. Pat. No. 8,403,755. The game results are streamed directly to the display. This illustrative embodiment would also work well for free play slot games. These embodiments are highly secure and simply require a networked display having a broadband connection.

For table games, the above also supports side betting from the player's mobile device and enables the casino to monitor the side bets while the table game is being played. This increases the number of players participating in the table game—if not enough seats are available at the table.

The CBUBL 462 and 482 enables real world transactions that require a token and a card become online transactions. More specifically, the mobile personalized news feed delivers the relevant information to complete an order and the CBUBL via path 3 and 4 communicates the item being purchased to the merchant VM that resides behind the CARE middleware platform. The traditional "one-click" transaction is then performed on the mobile device. This approach obviates the need for a traditional POS solution. Local validation of the transaction occurs with a sensor input such as weight, an RGB camera, a motion sensor, or other such local networked devices that monitor the delivery of the product to the customer.

With the CBUBL, the same decoupling of the UI and underlying computing system continues with other systems such as ERM, CRM, Inventory Management, Food and Beverage ordering. The UI/UX resides on the handset, the system operations are performed in the cloud, and the network device validates that the transaction has been performed.

Referring to FIG. 5, there is shown the electrical components for an illustrative wireless device 500. For purposes of this patent, the illustrative wireless device 500 is a multi-mode wireless device that comprises a first antenna element 502 that is operatively coupled to a duplexer 504, which is operatively coupled to a multimode transmitter module 506, and a multimode receiver module 508.

An illustrative control module 518 comprises a digital signal processor (DSP) 512, a processor 514, and a CODEC 516 that are communicatively coupled to the transmitter 506 and receiver 508. It shall be appreciated by those of ordinary skill in the art that the transmitter module and receiver module are typically paired and may be embodied as a transceiver. The illustrative transmitter 506, receiver 508, or transceiver is communicatively coupled to antenna element 502.

The DSP 512 may be configured to perform a variety of operations such as controlling the antenna 502, the multimode transmitter module 506, and the multimode receiver module 508. The processor 514 is operatively coupled to a responsive input sensor 520 such as a keypad or a touch screen. In operation, the responsive input sensor 520 receives a responsive input after the illustrative dynamic portal or context aware news feed is presented to the end user.

The processor 514 is also operatively coupled to a memory 522, a display 524, and a sensor 526. The sensor 526 may be used to determine an indoor and outside location for the illustrative wireless device.

Additionally, the processor 512 is also operatively coupled to the CODEC module 516 that performs the encoding and decoding operations and is communicative coupled to a speaker 526, and a microphone 528. The CODEC module 516 is also communicatively coupled to the display 524 and provides the encoding and decoding operations for video.

The memory 522 includes two different types of memory, namely, volatile memory 523 and non-volatile memory 525. The volatile memory 523 is computer memory that requires power to maintain the stored information, such as random access memory (RAM). The non-volatile memory 525 can retain stored information even when the wireless communication device 500 is not powered up. Some illustrative examples of non-volatile memory 525 include flash memory, ROM memory, and hard drive memory.

Wireless device 500 may be a mobile handset, mobile phone, wireless phone, portable cell phone, cellular phone, portable phone, a personal digital assistant (PDA), a tablet, a portable media device, a wearable computer such a GOOGLE GLASS, or any type of mobile terminal which is regularly carried by an end user and has all the elements necessary for operation in a wireless communication system. The wireless communications include, by way of example and not of limitation, CDMA, WCDMA, GSM, UMTS, or any other wireless communication system such as wireless local area network (WLAN), Wi-Fi or WiMAX.

Referring to FIG. 6, there is shown a plurality of sensors 600 that can be used to receive a responsive input that is communicated to the CARE platform. Additionally, the sensors 600 can also be used to assist in determining the indoor location or the outside location of the wireless device. The sensors may be integrated with a wireless device 500, digital signage 432, a gaming machine 434, a set-top box 1002, a game console 1002, a wired device such as a PC 424, and other such devices that include a memory and a processor that are networkable.

Generally, the touch screen 602 is used to receive a responsive input, however, the touch screen may also be used to indicate a location if a map is presented to the end user that enables the end user to provide a particular indoor location.

Generally, the eye tracking module 604 is also used to receive a responsive input, however, the eye tracking module may also be used to track the end user's eye movements to determine the end user interests that may assist in developing a user profile. The eye tracking module may be associated with a wireless device such as GOOGLE GLASS.

Generally, the infrared (IR) camera 606 may be used to receive a responsive input such as a gesture. The IR camera may also record a background that can be used to determine an indoor or outside location. The IR camera may be associated with a device such as the KINECT for XBOX.

Generally, the RGB camera 608 may be used to receive a responsive input such as monitoring an end user's facial expression or an end user's age. The RGB camera may also record a background that can be used to determine an indoor or outside location. The RGB camera may be associated with a device such as the KINECT for XBOX.

Generally, the navigation keys 610 and button 612 are used to receive responsive input, which may also be related to determining indoor location and outside location.

Generally, the near field communication (NFC) device 614 is used for contactless payment systems. Thus, the completion of a transaction may qualify as a responsive input and the transaction may result in the determination of a particular indoor or outside location.

Generally, a Bluetooth module 616 that can support Bluetooth versions 1, 2, 3, 4 and other future versions may be used to determine indoor location. For example, the iphone 4S and 5 use Bluetooth for determining indoor location. In certain instances, the Bluetooth standard may also be used to receive a responsive input.

Generally, a proximity sensor 618 is associated with a wireless device and is used to detect the presence of nearby objects without any physical contact. Thus, the proximity sensor is generally used to receive a responsive input.

The microphone 620 may be used to determine location by receiving high frequency sounds that are not audible to the human ear, and communicate these high frequency sounds to a location server that can then determine a particular location for an illustrative wireless device. The microphone 620 may also be used to receive a voice command that provides a responsive input.

The RFID module 622 may be used for communicating a particular location or be indicative of a responsive input, such as a check-in with a employee badge having an RFID tag.

The Assisted GPS module 624 (A-GPS) is generally used to provide a location; however, in certain instances when an end user crosses the perimeter of a geofence, it may result in a responsive input.

An ambient light sensor 626 or photosensor detects changes in light, and the changes in light may be generally associated with a responsive input. The temperature sensor 628 detects the temperature, which may be generally associated with a responsive input. The pressure sensor 634 detects the pressure and is generally associated with a responsive input, e.g. change in pressure may indicate change in weather, which may result in modifying the context aware news feed.

The gyroscope module 630 may be used for motion sensing, which can assist in determining location. Additionally, the gyroscope module may also be used to receive a responsive input, e.g. by shaking the wireless device.

The GPS module 632 is generally used to provide a location; however, in certain instances when an end user crosses the perimeter of a geofence, it may result in a responsive input.

The accelerometer module 636 and compass 644 may be used for motion sensing, which can assist in determining location. Additionally, either the accelerometer module or the compass may be used individually to determine a location. In conjunction with the gyroscope module 630, the accelerometer module 636 and compass 644 may be used to determine location. Additionally, the gyroscope module 630, the accelerometer module 636, the compass 644, and any combination thereof may be used to receive a responsive input, e.g. pointing the wireless device in a particular direction.

The Wi-Fi module 638 may be used to connect with access points and to also detect different SSID and beacon signal strengths, which as described herein can be used to determine an indoor location. Additionally, if a geofence is entered, this triggering event may be a responsive input.

The bar code 640 module and the QR code 642 module may be used to determine a location, to provide a responsive input, or the combination thereof.

Referring to FIG. 7, there is shown an illustrative CBUBL 700 that helps provide Context By User and By Location (CBUBL). The illustrative CBUBL 700 is a Bluetooth wireless gateway that facilitates supported the CARE Services and Products. By way of example and not of limitation, the CBUBL 700 may be embodied in Bluegiga APx4 Wireless System-on-Module (APx4). The illustrative APx4 includes a Bluetooth 4.0 module (BLE) 702 and includes an ARM processor 704 and memory 705. The illustrative CBUBL 700 also includes a WiFi module 706 and Ethernet port 708. Additionally, the CBUBL 700 includes a USB port 710 and I/O interface 712. In this illustrative embodiment, the Bluetooth module 702 and Wi-Fi module 706 are used for indoor positioning.

The most common form of Bluetooth indoor geofencing relies on proximity sensing, in which the strongest signal is used to determine the location of the wireless device. Another common form of indoor positioning uses centroid localization algorithms and particle filters. These common forms of indoor positioning do not work for casino because casinos commonly have areas with high customer density such as around a "hot" table or a "hot" machine. Thus, for casino properties customer density is an important issue that must be addressed. Additionally, casinos also have entertainment venues that hold a high number of people and such environments would necessitate being able to increase and decrease beacon transmit power.

In this illustrative embodiment, the WiFi and/or Bluetooth indoor geofencing technology relies on a principle called "kriging," which refers to a geospatial interpolation model that is statistically driven. Mathematically, kriging relies on regression analysis and the CBUBL operates as a beacon and a sensor of other beacons wherein the CBUBL is in a known fixed location. The CBUBL 700 is configured to perform the following: adjust a variable beacon transmit amplitude; detect other CBUBLs; support Wi-Fi communications; enough memory and processing capabilities to support CBUBL encryption and/or decryption; and receive or "sense" beacon signal strength emitted by other CBUBL or other Bluetooth (Wi-Fi) beacons; and interface with networked devices.

The CBUBL 700 and illustrative indoor geofencing technology adjusts beacon transmit amplitude because of RF signal variability caused by water absorbing RF at 2.4 GHz (BLE transmit frequency). Basically, humidity and the number of people in the area near the beacon substantially affect RF signal readings. Thus, there are instances (lots of people near the beacon) when there is a need to amplify beacon signals. Alternatively, when there are few people in the particular area, there is a need to turn down the beacons so that there is sufficient "contrast" between beacons to determine indoor location.

The CBUBL 700 can sense beacon signals, so that the appropriate calculated or interpolated RF values can be generated for indoor positioning. The sensed RF values may be used to calibrate or "tune" the calculated RF signals or to adjust beacon signal strength. Kriging models lend themselves to collecting measured data at particular locations, i.e. the CBUBL, and then building the interpolation model.

Referring to FIG. 8 there is shown an indoor geofence 802 that is defined by a plurality of CBUBLs and the Content Management System presented in FIGS. 10A-10F. The three different CBUBLs 804, 806 and 808 are used to generate the indoor geofence 802. For example, each of the illustrative CBUBLs is configured to transmit a BT signal and receive BT signals. The received BT signals are communicated via a Wi-Fi module 810 that is in communication with Access Point 812 that communicatively coupled to an illustrative router 814, which is further communicatively coupled to a wide area network 816 such as the Internet. An illustrative cloud based indoor positioning system, which is described above, receives the BT signals and develops the calculated geospatial model, i.e. kriging model, which includes a look up table for determining the indoor location of the user.

Referring to FIG. 9 there is shown an illustrative flowchart 900 of a CBUBL set-up process. At block 902, the CBUBL is positioned on an indoor map and then the CBUBL is turned on at block 904. The illustrative CBUBL may have two LEDs 820 and 822 as shown in FIG. 8 above.

At block 906, the first LED 820 is used to show that Wi-Fi communications with the local AP is working. At block 908, the second LED 822 is used to reflect whether the CBUBL, which is in sense mode, is able to detect other CBUBL beacons signals, which may be Wi-Fi or Bluetooth.

The method then proceeds to block 910 where sensor data is obtained from each CBUBL. The illustrative sensor data may include WiFi beacon signals and/or Bluetooth beacon signals, wherein the beacon signals include a beacon identifier and signal strength associated with the beacon identifier.

At block 912, the sensor data captured by the illustrative CBUBL is the communicated to the CARE middleware platform as described. The sensor data is used to calibrate the interpolated data sets. Additionally, the sensor data may be used to adjust the beacon signal strength that is emitted from one or more CBUBLs.

The CBUBL may also include one or more sensors such as motion sensors, an RGB camera, temperature, humidity and other such sensors. Data from the CBUBL is communicated to the illustrative CARE middleware using Wi-Fi. The CBUBL is continuously checking for known and unknown radios.

The method then proceeds to decision diamond 914, where each CBUBL continues the process of detecting beacon identifiers and measuring the corresponding beacon signal strength by returning to block 906 and repeated the steps described.

Referring to FIG. 10A there is shown a home page for a web-based interface that allows the customer to configure the CARE system. The home page 1002 includes a standard features such as login and password that are provided for system entry. The home page includes a large scale map and allow the user to view a particular geographic location. Once established, the user can then create a "Property Bubble," which is a property specific geofence.

Referring to FIG. 10B there is shown a user interface 1004 for building a property map that is associated with the property bubble. The property map provides a map of the area covered by the system. The map provides a representation of an area that be further divided into smaller geofences, which are also referred to as "content bubbles." Once the property bubble and map have been established, the next step is to create a series of content bubbles within the boundaries of the property. The content bubbles are the logistical geofence areas of the system and determines when, where and how content is distributed.

Referring to FIG. 10C there is shown the user interface 1006 that enables the content bubbles to be populated with content and related content links. The content and related content links appear directly on the display of a wireless device and can also be used to drive remote displays in a particularly selected area. There are a range of different content link types with varying types of association, levels and property filters. One of the link types is a global link types, which includes parent links and user posts. Another link type is an end-point link type that includes external links, e.g. a web page, an image, a video, an audio, a map and other such end-point content links. Yet another link type is the external display link type, which is associated with interactive digital signage, a networked display, a slot machine and other such networked external display. The various external display link types include external links, e.g. a web page, an image, a video, an audio, a map and a proximity display. lay Referring to FIG. 10D there is shown the user interface 1008 that includes the variety of link types that can be associated with content, which is communicated to the wireless device. Fundamentally, this page enables users to associate content with a geofence and a user profile. The user interface 1008 enables links to be associated with a content URL. By way of example and not of limitation, the content can be stored on an operator's server system. Links can be modified and adjusted at any time and updated in real time via the server system. The frequency with which the content can be delivered may be updated on a timed interval (between 5 and 60 seconds) and the dynamic portal interface is updated based on the changes to user location based on the user entering or exiting an indoor geofence.

Referring to FIG. 10E there is shown the site survey user interface 1010, which is used to build the geospatial interpolation model referred to as "kriging." In the illustrative embodiment, a high-density Wi-Fi or Bluetooth beacons are used for indoor positioning. The read locations are associated directly with the property map. The administrator can elect to use CBUBL as described above or the "super user" may elect to gather RF fingerprints from various areas within the property. If the super user elects to gather RF fingerprints, the user chooses a location on the map displayed on their wireless device and then proceeds to perform an RF fingerprint grab. The RF fingerprint grab is associated with the super user's selected location and after a plurality of these RF fingerprint grabs are collected at a variety of different location, the calculated RF fingerprints are determined algorithmically. The RF fingerprint grabs are uploaded to the indoor positioning database associated with the CARE platform.

Referring to FIG. 10F there is shown an indoor map 1012 having a plurality of beacons surrounding a particular area. The beacons create a geofence that is defined by having strong signals in specific areas and these strong signals define the boundaries of a particular geofence.

By way of example and not of limitation, the beacons 1014a through 1014n surround a particular area, which in this instance is the "North Casino." The North Casino is a mobile enabled real money gaming indoor location, in which players can interface with gaming devices such as networked displays, slot machines, other players using the player's smartphone or tablets. For wagering, the players are confined to the boundaries of the North Casino. Since the operator must comply with regulatory requirements, real money wagering is not allowed outside the North Casino. However, free play wagering can occur outside the North Casino.

The illustrative beacons 1014a through 1014n are CBUBL beacons as described above. By way of example and not of limitation, the illustrative CBUBLs 1014a through 1014n may be integrated into a lighting system that surrounds the regulated North Casino. Alternatively, the beacons may be integrated into a networked display so the CBUBL beacons 1014a through 1014n represent networked displays, which can communicate with the player as the enter or leave the authorized North Casino gaming area.

In the illustrative embodiment, the user 1016 is within the North Casino gaming area and is able to wager within the perimeter defined by the CBUBL beacons.

Additionally, each area identified in the map, e.g. Canyon Cafe 1018, is a geofenced area and has associated content that is filtered for the user based on location and user profile. Thus, the user can select map 1012 on their mobile app and if the user selects the Canyon Café, the user will see the news feed that would be delivered to the user if they were to enter the Canyon Café. Further detail of this feature is provided in provisional patent application 62/023,801 entitled and filed on Jul. 11, 2014 which if hereby incorporated by reference.

Thus, when illustrative map 1012 is presented on the user's smartphone and/or tablet computer, the illustrative user 1016 (indicated by the black dot) may see content in other geofences or CONTENT BUBBLES. To access the content in the other geofences, the use would click the "MAP" tab and is presented a map with a plurality of geofences. The user can then select the content that corresponds to a particular geofence. As presented above in the API section, the selectable geofence on the "map" tab allows an end user to retrieve a map displaying clickable content bubbles overlaid on an indoor/property map image. This will allow users to explore the content for various physical spaces without requiring them to physically move to the desired bubble/space. This would also provide a working interface to provide contextually relevant content by location without Wi-Fi or other indoor positioning methods, such as Bluetooth beacons that can be used for iOS devices.

Referring to FIG. 11A, there is shown an illustrative dynamic portal 1102 associated with the MADGUI, may also be integrated with a wearable device 1104 such as a Samsung Galaxy Gear. In the illustrative embodiment, a dynamic news feed is presented to the user on his smartphone; and the top two content items 1106 and 1108 on his dynamic portal feed is presented on the wearable device 1104. The wearable device also indicates time.

The user can interface with the content via the wearable device or with the smartphone. When the user touches the content item on the wearable device, the end user is then taken to the appropriate destination to interact with the content. For the illustrative SMS from Marie notification or "link," the user touches the link and is then taken to the SMS application and can then respond to the SMS. If the user touches the "valet parking" link, the user is taken to the hotel's mobile application and can check-in at the lobby and indicate that she is ready to pick-up her car.

Other end user applications include, but are not limited to, placing orders for food and beverages, ordering tickets, interfacing with gaming and/or gambling machines, interacting with digital signage, controlling the digital signage from the user's watch, interacting with the user's social network using a social platform, providing feedback to content or content links, interacting with kiosks, reading QR codes, reading NFC RFID, and performing transactions including but not limited to loyalty points, coupons, and cash transactions.

Referring to FIG. 11B and FIG. 11C, there is shown an illustrative UI for a service employee that utilizes a smartphone 1110 in combination with a wearable device 1112. The benefit of a wearable device for service employees is that they can be using their hands to complete a task while also monitoring their wearable device without having to interact directly with their smartphone.

In the illustrative embodiment, the MADGUI can serve up and present a variety of tasks that have to be completed. The task list may be set up by a supervisor. For example, a person may be seating people and indicate that a particular person sat down at a particular table and at a particular time. These are the initial conditions that go into the database. As set of triggers are then created, such as within 5 minutes get a drink order. If designated person cannot acknowledge getting drink order within 5 minutes to a particular table, then the nearest waiter can take the drink order within the 5 minute period. The system may also be set-up so that at minute 10 a food order should be received and at 20 minutes, the food order should be served. At minute 40, the customer is told about desert, and table clean-up should start at minute 50.

In the illustrative screen shot 1110, James 007 has selected the task at the top of the list (indicated by the grey dot) and has begun the task of cleaning Table 42. This task has been communicated to James 007's wearable device 1112. James can indicate that he has started this task and completed this task, and a database records when he started and completed the task.

Since James has selected a particular task, the task is removed from the dynamic portal and the second employee Garfield gets a different task list 1114 (shown in FIG. 11C) that does NOT include the Clean Table 42 content item or notification. The task list received by Garfield's wearable device 1116 presents the next order on the MADGUI. After seeing this task identified on Garfield's wearable device, Garfield may decide that it is inappropriate to perform this task, because another waiter is performing this particular task and does not require assistance.

Garfield may determine that they need to perform another task on the task list and may proceed to access the smartphone device to determine another task to perform. Garfield then selects the appropriate task and this task is also removed from the task list that is shared with the wait staff. Garfield also has a start time and finish time, which are logged in the illustrative database.

The dynamic employee task list that receives employee input may also be filtered based on indoor and/or outdoor location and the user profile. For example, a busboy may receive a different task list than a waiter. Also, the task list may be ranked and/or filtered based on the employee's proximity to the particular task. Thus, each employee may obtain a different task list based on his or her location and user profile—similar to the MADGUI systems and methods presented herein and in the NEXRF patents and patent applications that are herein incorporated by reference.

The dynamic employee task list may also be expanded to other industries such as the retail industry, in which a retail clerk receives a checklist of items that need to be completed such as assisting customers, checking inventory, reporting theft, calling for assistance, and other such activities that are managed by their supervisor.

In a casino environment, the checklist can include content items about a particular player indicating that they are VIP or "high roller" and providing a picture and name. For a slot technician, the task list may indicate the machines that need to be fixed and their location.

From a facilities management perspective, a facilities manager can indicate tasks that need to be completed by particular independent contractors and can also ensure that the appropriate inspections are performed after the independent contractor's activities are completed.

As presented above, the employee may also leave comments or "posts" in particular geofences or CONTENT BUBBLES similar to the proximity-based social presented in NEXRF 11.011 in U.S. patent application Ser. No. 13/251, 724; and the posts can be accessible with the "map" tab of the illustrative BUBBLE POST presented herein in.

Referring to FIG. 12 there is shown a method for using the content generated by the news feed to be used to generate a "social" slot machine, wherein each reel stop includes some type of social content such as a picture, text, a video or any combination thereof. The illustrative social slot game is first downloaded to the illustrative wireless device at block 1202.

The method then proceeds to block 1204 where the user registration information is accessed. This user registration information may be associated with a particular social network that shares its news feed with the "social" slot machine mobile application.

At block 1206, the social content is associated with a reel stop. Alternatively, the social content may be associated with a playing card, or a lottery number, or an image ID which is determined by a paytable that relies on a random outcome being determined by a random number generator.

At block 1208, the game session is initiated. For the illustrative embodiment, the game session is initiated as if by hitting the start button of an illustrative slot machine. The method then proceeds to block 1210 where the game session for the game of skill or game of chance is played through the end of the game session.

The method then proceeds to decision diamond 1212, where a decision is made to start a new game session or to end the game. An illustrative screenshot of the social slot machine is presented in FIG. 13B.

Referring to FIG. 13A, there is shown an autonomous dynamic graphical user interface 1302 that is communicated to the wireless device. The autonomous dynamic graphical user interface 1302 includes a plurality of targeted content items that are filtered based on user profile and indoor location. The Bubble Post/MADGUI app can now be installed on the user handset and the system will be functional and operational. The user can see all relevant links served up on his handset and he has the option of interacting with them directly at this point. Users can like or dislike links, as well as ratings adjusted by activity/interaction, and this will move their contextual ranking levels and corresponding display level within the system. Users can also post their own content at this stage—making comments, suggestions, finds, likes etc. The content is displayed within that particular content bubble and will be seen by all other users in that area. Similarly these posts can be liked or disliked and their prominence will be adjusted accordingly.

Additionally, at least one of a plurality of targeted content items may be associated with a targeted content item decryption key such as link 1304 that is associated with a Wheel of Fortune slot machine. If a user input is received for link 1304, this received user input triggers transmitting a selected content item decryption key from the wireless device to the networked client device.

The user may then swipe the UI from right-to-left to see the next screen, which is adjacent to the MADGUI screen 1302 and presents a game such as the illustrative social slot machine. Again, the MADGUI 1302 presents a dynamic portal.

Referring to FIG. 13B there is shown a screen shot 1306 of the illustrative social slot machine game, which is the adjacent to screenshot 1302. The illustrative slot machine screen shot 1306 includes user posts and local merchant content. So instead of the slot reels having images, the slot reels display social text or social images or some combination thereof. The text can include messages from a person's social news feed, e.g. BubblePost feed and information from local merchants, e.g. the Gift Shop. Additionally, pictures from the user's social news feed may also be associated with reel stops.

Other gaming content may also be presented and the social slot machine game is provided for illustrative purposes only. For example, iGaming content may be presented when the user swipes the touchscreen from the dynamic portal home page. The iGaming content refers to online or internet gambling, which includes online poker, internet casinos, virtual sportsbooks, web-based lotteries, mobile gambling, and pari-mutuel racing. iGaming takes place on the Internet and includes the following basic components: software (backend database and front end gaming); hardware; financial transaction processing, and customer service. Components of iGaming may take place over the phone, especially customer service interactions. Additionally, iGaming, as used herein, also refers to video games online and includes skill gaming, such as a trivia game such as Buzztime Trivia. iGaming also includes games that have previously been embodied as electronic, electromechanical or mechanical gambling, and casino game facsimiles, such as roulette, Keno, bingo, twenty-one, blackjack, craps, poker, wheel of fortune, baccarat, pai gow, slot machines, video poker machines, video lottery machines, lottery, sports betting and pari-mutuel wagering; as well as games of skill and or strategy such as chess, checkers, backgammon, "board" games such as Monopoly and Scrabble, card games such as Pinochle, Hearts, Spades; video based games such as Doom, Pong, Pac-man; video-games based on sports such as golf, baseball, football, basketball, soccer, rugby; arcade type games; non-house stake games between two or more players; games defined by IGRA (Indian Gaming Regulatory Act) as class II games; social games such as Farmville; online poker games such as five card stud; and class III games that are referred to as Vegas-style slot machines.

The gaming content presented may also be tracked with a slot management system, player tracking system, CRM, user profiles and attributes obtained from advertisers, e.g. Google, and from social content, e.g. Facebook.

Referring now to FIG. 13C, there is shown an illustrative screen shot 1308 that is presented when the player is in a free play zone and is not able to wager. More specifically, the user may swipe the UI from right-to-left, or the user may be taken directly to the next screen, which presents the user awards. This is presented in the third screenshot from the left. The user awards include coupons or discounts, and also accumulated points. The accumulated points may be provided as part of a scavenger game—so the player must enter a particular content bubble. Additional points may be awarded for staying in the particular location. Alternatively, the player may purchase additional credits to continue playing the illustrative social casino game.

In the illustrative embodiment, the screenshot 1308 reflects that the user has won a 10% Gift Shop discount. Additionally, the other awards the user has won are also displayed. In the illustrative embodiment, the user has won a variety of coupons and has also won loyalty points. The accumulated point may also be loyalty points may be redeemed at various locations, or the user may be awarded loyalty points for entering a particular location, or staying in that particular location, or any combination thereof. At the bottom of this screenshot, the user has an e-wallet of his coupons and award points. Additionally, the e-wallet may include financial information that is tied to a bank or to a merchant reward program.

Referring to FIG. 13D, there is shown a screenshot 1310 for real money wagering, which occurs in a particular zone within the casino property as described above. The real money wagering screenshot 1310 indicates the available credits, the available cast and awarded loyalty points. Additionally, information for sports betting is also provided. Furthermore information about favorite slot machines and even playing a lottery within the casino property are options that are provided to the player.

Referring to FIG. 14A there is shown a wireless device 1402 that has the controls for an illustrative gaming machine 1404. Referring to FIG. 14B there is shown a screenshot of the slot machine controls is shown in screenshot 1406 and the animated images are presented on the slot machine display 1408. Additionally, the underlying game session may trigger a separate bonus that may only be played on the slot machine 1404 and the bonus game is presented on bonus display 1410.

In this embodiment, an encrypted data file that includes a plurality of animated images associated with a game that operates within the geofence so that a game session is initiated when the wireless device is the within the geofence associated with the slot machine, which is a networked client device.

In a further still illustrative embodiment, the encrypted animated images are communicated from the networked client device, e.g. the slot machine 1404, to the wireless device 1402, when the wireless device is within the geofence associated with the networked client.

As described previously, a decryption key may be communicated to the wireless device, when the wireless device is within the geofence associated with the networked client device, e.g. the slot machine. Additionally, the decryption key is removed from the wireless device, when the wireless device is outside the indoor geofence which is defined as described above.

The illustrative game operating on slot machine 1404 may be a lottery game, in which the award is determined by matching numbers and the order of selection of numbers. The user's numbers are communicated by the wireless handset. For example, there may be 5 numbers selected out of 10 numbers. The awarding of a prize may be determined based on matching one or more numbers, regardless of the order of the random selection. Thus, if the client device numbers are 1, 2, 3, 4, 5 and the randomly selected numbers are 7, 9, 2, 4, and 10, then a player receives an award for having two numbers that match, i.e. 2 and 4 match, but there is no additional award based on order, namely, the fourth client number is "4" and the fourth selected number is also "4."

In another embodiment, the award may be based on matching one or more numbers and matching the order of selection of the numbers. There, if the client device numbers are 1, 2, 3, 4, 5 and the randomly selected numbers are 7, 9, 2, 4, and 10, then a player receives an award for having two numbers that match, i.e. 2 and 4 match, and the award is also based on matching the order of selection, so that the fourth client number is "4" and matches the fourth selected number is also "4," which results in a larger award than in the previous embodiment.

In yet another embodiment, the game supports the selection of a much larger pool of numbers such as 5 numbers are selected out of 100 numbers. A non-progressive prize is awarded based on the selection of the first three numbers, and if the first three numbers match, then a progressive prize is awarded for matching the remaining two numbers. Thus, if the client numbers selected are 73, 52, 34, 77, and 88 and the randomly selected numbers are 34, 73, 88, 77 and 23, then the player is awarded a prize for having three matching numbers according to a non-progressive paytable. In this illustrative embodiment, the player does not qualify for the progressive prize unless at least three numbers match (so order is not critical in this embodiment), and so the player is entitled to the progressive prize, which may require that at least one of the two numbers match and the at least one matching number have a matching order. In this illustrative embodiment, the player is entitled to the progressive prize because the fourth number associated with the client is 77 and the randomly selected number is 77. Since there is a match, the player has won the progressive.

The systems and methods presented herein have the added benefit of enabling the real time analysis of an incremental marketing campaign, adjusting the marketing campaign in view of the analytic data, and iteratively improving the marketing campaign based on user feedback, user attributes, particular location, and time.

The analytic approach presented herein is different from A/B testing, multivariate analysis, and choice modeling, because the CARE platform model starts with user attributes and can generate a predictive model for a small test population. The test population includes a geo-spatial component for the user feedback and engagement, and tracks geo-spatial user feedback to determine the most engaging content to serve end users with the MADGUI.

As shown above, the API framework supports receiving user feedback responses and associating a location for the user feedback, wherein the location information includes indoor location and outdoor location.

The API framework supports tracking user responsiveness using various wireless devices such as smartphones, tablets, and wearable devices such as the Samsung Galaxy Gear watch and Google Glass.

Responsive Analytics may also be generated that track "responsive" smartphone actions that are "triggered" by targeted content that includes print advertisements, content on digital signage, notifications communicated to the smartphone, or other such marketing and/or advertising content that is presented or served at particular location and time for a particular user.

The attributes that are developed are based on business analytics for example: sex, age, zip code, favorite games, click-through, feedback positive, feedback negative, posts, key words in posts, loyalty points, task for incrementing loyalty points, tasks for decrementing loyalty points, coupons served, coupons used, coupons expired, and coupons deleted.

The user analytics can be associated with groups sharing similar attributes. User analytics can also be associated with a three-dimensional space using a heat map. Interactions with the physical space can be determined based on actions taken by the user and/or actions monitored by third parties, e.g. employees.

The analytics presented herein support predictive modeling of single-user interactions based on group interaction, so that a user interaction is optimized according to the historical group interactions. This may be considered predictive analysis.

Alternatively, a small sampling of users can also be used to extrapolate group interactions. Thus a small test group can be presented with a new content link, and since the small test group represents a portion of group distribution response, the small group response can be used to model the distribution of response for a much larger group. Thus a small data set can be applied to a much larger group. For example, limited customer feedback (don't like content) may be applied to a much larger group.

The goal is to identify the optimal set of user attributes to track and then to analyze the data in real time to determine what would be most engaging to the end user. As a result, the measurements that are gathered require monitoring only for changes, and as such require much smaller data sets, which can then be used to extrapolate what is engaging to a much larger group of users.

The illustrative systems and methods presented herein rely substantially on a network appliance such as a remote server, virtual machine, local server, container, cloud module, or other such network appliance. However, many of the operations performed on a network appliance may also be performed locally on a wireless device. These operations would be performed by multithreading a variety of operations such as updating content items, storing content items locally, determining indoor position on the handset, and determining when a geofence is accessed with the wireless device.

For example, the wireless device may download a file that includes the appropriate mapping information, and the user attribute information may be stored locally on the device. The downloaded mapping information may include content associations such as hyperlinks to content that is accessible via a web browser.

The wireless device may also receive periodic updates so news feeds can be integrated with the MADGUI. The MADGUI may cache this information on the wireless device, so the MADGUI can be called up very quickly—rather than having to wait for the network appliance to send the MADGUI to the wireless device.

The wireless device may also store beacon tables that are used for indoor positioning. The illustrative beacons may be Wi-Fi beacons or Bluetooth beacons. The wireless device may also perform the interpolation modeling locally.

The wireless device may also perform the operations of caching content so that the content may be readily accessible when the user access the mobile app on his wireless device. The process of caching content items may also include calling the appropriate network appliance to update the locally stored content.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A method for communicating secure content to a stationary networked beacon and a mobile wireless device, the method comprising, storing a plurality of data files in a storage network cloud component;

generating, by the stationary networked beacon, a beacon identifier;

registering the stationary networked beacon at a registration cloud component, wherein the registration of the stationary networked beacon includes the beacon identifier;

registering the mobile wireless device at the registration cloud component;

generating an encrypted data file from a data file at an encryption network cloud component that is communicatively coupled to the storage network cloud component, wherein the encryption network cloud component also generates a decryption key that is associated with the encrypted data file;

communicating the encrypted data file along a first network communication path to the registered mobile wireless device;

communicating the decryption key along a second network communication path to the registered stationary networked beacon;

detecting, by the mobile wireless device, the beacon identifier associated with the stationary networked beacon;

determining a proximity of the mobile wireless device to the stationary networked beacon from the detected beacon identifier associated with the stationary networked beacon;

communicating the decryption key from the stationary networked beacon to the mobile wireless device along a third network communication path, when the mobile wireless device is within the proximity of the stationary networked beacon; and decrypting the encrypted data file on the mobile wireless device with the decryption key transmitted by the stationary networked beacon.

2. The method of claim 1 wherein the second communication path includes a local area network that supports the stationary networked beacon being communicatively coupled to a firewall that is communicatively coupled to each network cloud component along a wide area network;

the first communication path includes a wireless carrier network operating a high bandwidth wireless protocol supports communications between the wireless device and each networked cloud component; and the third communication path includes a localized wireless communication protocol that supports communications between the mobile wireless device and the stationary networked beacon.

3. The method of claim 1 further comprising generating an autonomous dynamic graphical user interface communicated to the mobile wireless device, wherein the dynamic graphical user interface includes a plurality of targeted content items that are filtered based on a user profile and an indoor location.

4. The method of claim 3 further comprising receiving a user input associated with one of the targeted content items and transmitting a selected content item decryption key from the stationary networked beacon to the mobile wireless device.

5. The method of claim 1 further comprising generating an indoor geofence that is associated with the stationary networked beacon so that the mobile wireless device receives the decryption key corresponding to the encrypted data file, when the mobile wireless device is within the indoor geofence.

6. The method of claim 5 wherein the encrypted data file includes a plurality of animated images associated with a game that operates within the geofence, the method further comprising initiating a game session when the mobile wireless device is within the geofence associated with the stationary networked beacon.

7. The method of claim 6 further comprising communicating the decryption key from the stationary networked beacon to the mobile wireless device, when the mobile wireless device is within the geofence associated with the stationary networked beacon.

8. The method of claim 7 further comprising removing the decryption key from the mobile wireless device, when the mobile wireless device is outside the indoor geofence.

9. A system for communicating secure content to a stationary networked beacon and a mobile wireless device, the system comprising, a storage network cloud component that stores a plurality of data files;

a registration cloud component that registers the stationary networked beacon, wherein the stationary networked beacon generates a beacon identifier so that the beacon identifier is included in the registration of the stationary networked beacon;

the mobile wireless device registered at the registration cloud component;

an encryption network cloud component that generates an encrypted data file from a data file, wherein the encryption network cloud component is communicatively coupled to the storage network cloud component, a decryption key that is associated with the encrypted data the generated by the encryption network cloud component;

a first network communication path between the encryption network cloud component and the mobile wireless device that communicates the encrypted data file to the registered mobile wireless device;

a second network communication path between the encryption network cloud component and the stationary networked beacon that communicates the decryption key to the registered stationary networked beacon;

a third network communication path between the mobile wireless device and the networked client device that communicates the decryption key from the stationary networked beacon to the mobile wireless device, when the mobile wireless device is within a proximity of the stationary networked beacon;

detecting, by the mobile wireless device, the beacon identifier associated with the stationary networked beacon;

determining the proximity of the mobile wireless device to the stationary networked beacon from the detected beacon identifier associated with the stationary networked beacon;

wherein the mobile wireless device determines the proximity of the mobile wireless device to the stationary networked beacon is by detecting the beacon identifier associated with the stationary networked beacon; and the encrypted data file on the mobile wireless device being decrypted with the decryption key transmitted by the stationary networked beacon.

10. The system of claim 9 wherein the second communication path includes a local area network that supports the stationary networked beacon being communicatively coupled to a firewall that is communicatively coupled to each network cloud component along a wide area network;

the first communication path includes a wireless carrier network operating a high bandwidth wireless protocol supports communications between the mobile wireless device and each networked cloud component; and the third communication path includes a localized wireless communication protocol that supports communications between the mobile wireless device and the stationary networked beacon.

11. The system of claim 9 further comprising an autonomous dynamic graphical user interface that is communicated to the mobile wireless device, wherein the autonomous dynamic graphical user interface includes a plurality of targeted content items that are filtered based on user profile and indoor location.

12. The system of claim 11 further comprising a received user input associated with one of the targeted content items, wherein the received user input triggers an event that includes transmitting a selected content item decryption key from the stationary networked beacon to the mobile wireless device.

13. The system of claim 9 further comprising an indoor geofence that is associated with the stationary networked beacon, wherein the mobile wireless device receives the decryption key corresponding to encrypted data file when the mobile wireless device is within the indoor geofence.

14. The system of claim 13 wherein the encrypted data file includes a plurality of animated images associated with a game that operates within the geofence, the method further comprising initiating a game session when the mobile wireless device is within the geofence associated with the stationary networked beacon.

15. The system of claim 14 wherein the decryption key is communicated from the stationary networked beacon to the mobile wireless device, when the mobile wireless device is within the geofence associated with the stationary networked beacon.

16. The system of claim 15 wherein the decryption key is removed from the mobile wireless device, when the mobile wireless device is outside the indoor geofence.

* * * * *